(12) United States Patent
Morikawa et al.

(10) Patent No.: US 8,307,991 B2
(45) Date of Patent: Nov. 13, 2012

(54) HOLLOW FIBER MEMBRANE MODULE

(75) Inventors: Hirofumi Morikawa, Shiga (JP); Yuji Tanaka, Shiga (JP); Kenji Sakai, Shiga (JP); Hidetada Kobayashi, Chiba (JP)

(73) Assignee: Toray Industries Inc., Tokyo (JP)

( * ) Notice: Subject to any disclaimer, the term of this patent is extended or adjusted under 35 U.S.C. 154(b) by 743 days.

(21) Appl. No.: 12/442,084

(22) PCT Filed: Sep. 12, 2007

(86) PCT No.: PCT/JP2007/067703
§ 371 (c)(1),
(2), (4) Date: Mar. 19, 2009

(87) PCT Pub. No.: WO2008/035593
PCT Pub. Date: Mar. 27, 2008

(65) Prior Publication Data
US 2010/0072124 A1    Mar. 25, 2010

(30) Foreign Application Priority Data

Sep. 19, 2006 (JP) .................................. 2006-252533

(51) Int. Cl.
*B01D 35/22* (2006.01)
*B01D 35/31* (2006.01)
*B01D 63/02* (2006.01)

(52) U.S. Cl. ................. 210/456; 210/321.88; 210/321.9

(58) Field of Classification Search .......................... None
See application file for complete search history.

(56) References Cited

U.S. PATENT DOCUMENTS

| | | | | |
|---|---|---|---|---|
| 4,061,574 A | * | 12/1977 | Clark | 210/321.9 |
| 4,220,535 A | * | 9/1980 | Leonard | 210/321.89 |
| 4,374,802 A | | 2/1983 | Fukasawa | |
| 5,227,063 A | * | 7/1993 | Langerak et al. | 210/321.78 |

FOREIGN PATENT DOCUMENTS

| | | |
|---|---|---|
| EP | 1 415 703 A2 | 5/2004 |
| JP | 62-190605 U | 12/1987 |
| JP | 63-168005 U | 11/1988 |
| JP | 7-171354 A | 7/1995 |
| JP | 11-90182 A | 4/1999 |
| JP | 2001-202976 A | 7/2001 |
| JP | 2004-050023 A | 2/2004 |

OTHER PUBLICATIONS

Machine translation of JP 2004-050023; obtained Apr. 18, 2012.*
Search Report dated Mar. 21, 2011 for European Application No. 07 80 7112.

* cited by examiner

*Primary Examiner* — Krishnan S Menon
*Assistant Examiner* — Katherine Zalasky
(74) *Attorney, Agent, or Firm* — Birch, Stewart, Kolasch & Birch, LLP

(57) ABSTRACT

This invention provides a hollow fiber membrane module which can reduce pressure loss in discharging water within a module and can reduce operating power. A hollow fiber membrane bundle is disposed within a cylindrical case having in its side face an opening part for the inflow/outflow of water, and the end of the hollow fiber membrane bundle is bonded at an axially outer position with respect to the opening for the inflow/outflow of water. A distribution holes is provided axially inward of the opening for the inflow/outflow of water and so as to surround the outer periphery of the hollow fiber membrane bundle, and grooves and/or corrugated protrusions are provided on the inner face of the distribution cylinder so as to be in communication with each other among the distribution holes.

12 Claims, 21 Drawing Sheets

HOLLOW FIBER MEMBRANE MODULE

TECHNICAL FIELD

The present invention relates to a hollow fiber membrane module. More specifically, the present invention relates to a hollow fiber membrane module which prevents pressure rise at a water exit when generating filtrate water or when washing the hollow fiber membrane; and which enables the filter operation to stably continue for a long period of time.

BACKGROUND ART

In an external pressure type hollow fiber membrane module in which a hollow fiber membrane bundle having about a few hundred to a several tens of thousands of hollow fiber membranes bundled together is accommodated in a cylindrical case, and both ends of the hollow fiber membrane bundle are adhered and fixed with resin, a water supply port for supplying raw water and a water discharge port for discharging are often arranged near both ends of the cylindrical case on a case side surface on the inner side than the adhered and fixed portion with respect to the axial direction of the cylindrical case. When the water supply port and the water discharge port are arranged on the case side surface, the device is structured such that a distribution cylinder (cylindrical body formed with great number of holes) is arranged on the inner side of the cylindrical case at a location where the water supply port and the water discharge port are arranged, and an annular flow path is formed to surround an outer periphery of the distribution cylinder, so that a dead space of the water flow is eliminated (see patent documents 1 and 2).

When raw water is supplied from the water supply port into the hollow fiber membrane module, the raw water passes through the holes of the distribution cylinder from an annular flow path near the water supply port and enters an outer side region of the hollow fiber membrane, and then penetrates through a hollow fiber membrane surface to immerse to the interior thereof, whereby the filtrate water passes through the interior of the hollow fiber membrane and is taken out from an opened end. When performing the raw water processing in a cross-flow method, the residual raw water that did not penetrate through the hollow fiber membrane surface passes through the holes of the distribution cylinder near the water discharge port, and passes the annular flow path to be discharged from the water discharge port.

In such hollow fiber membrane module, the raw water is supplied from the water supply port and the raw water is flowed out from the water discharge port, similar to the raw water processing in the cross-flow method, before starting the filter operation. The gas and the like that entered the module at the beginning then flows out from the water discharge port by supplying and discharging the raw water, so that the filter region in the module can be filled with raw water.

However, even if the interior of the hollow fiber membrane module is filled with raw water, if the filter operation is immediately started, the air remaining in a piping and the like in the middle of the raw water supply line is accompanied by the raw water and immerses in the hollow fiber membrane module with elapse of time, whereby the air may clog the hole of the hollow fiber membrane thereby reducing the effective filter membrane area. Therefore, even after the filter region is filled with raw water, the filter operation is not immediately started, and the raw water is continuously supplied and flowed out from the water discharge port for a while so that the air entered into the module can be discharged, and thereafter, the filter operation is started.

Furthermore, after the filtering process of a constant time is terminated, backflow washing of supplying filtrate water or high pressure air from the filtrate water exit side and flowing the same to the raw water side, and air scrubbing of supplying the raw water mixed with high pressure air of only the high pressure air from the water supply port side, and discharging suspended matters accumulated in the module are performed. The wash wastewater and waste gas are flowed out from the water discharge port even when performing such washing.

In such case, when the water or the air flowed into the filter region is to be discharged to the outside of the module, they pass through the holes (distribution hole) formed in the distribution cylinder to flow out to the annular flow path at a periphery of the distribution cylinder, and ultimately, flow out to the outside of the module from the water discharge port formed at a side surface. The water and the air passed through the holes of the distribution cylinder and flowed out all concentrate near the water discharge port, which increases the pressure loss near the water discharge port. As a result, the drive force necessary for the filter operation and the supply pressure in time of washing need to be raised, whereby loss of raw water also occurs in addition to the loss of time until the start of filtering and the loss of operation energy.

Such problems are not limited to a case where the water supply port is arranged near the end of the cylindrical case and at a case side surface position on the inner side than the adhered and fixed portion with respect to the axial direction of the cylindrical case, and similarly arise even when the water supply port is arranged at the end of the cylindrical case and the through-hole through which the raw water passes is formed at the adhered and fixed portion if the discharge port is arranged near the end of the cylindrical case and at the case side surface position on the inner side than the adhered and fixed portion with respect to the axial direction of the cylindrical case.

As a means for solving such problem, patent document 1 proposes changing the hole-opening area of the distribution hole formed in the distribution cylinder on the circumference so as to become larger the more distant from the discharge port, patent document 2 describes arranging the distribution cylinder such that the width of the annular flow path on the outer side of the distribution cylinder becomes a maximum near the water discharge port, etc.

The problem of increase in pressure loss due to increase in flow rate near the water discharge port can be considerably alleviated by the improved means described above.

However, a phenomenon in which the hollow fiber membrane is pushed by the flow of water and air trying to flow out, and the hollow fiber membrane is pushed against the vicinity of the distribution hole of the inner wall of the distribution cylinder occurs in the distribution cylinder, whereby the distribution hole tends to be easily blocked by the hollow fiber membrane bundle being pushed. The problem of blocking of the distribution hole by the hollow fiber membrane particularly easily occurs when the diameter of the distribution hole is small or when the filling rate is high or a great number of hollow fiber membranes are filled in the module. Thus, reduction of the pressure loss by the blocking of the distribution hole is demanded to sufficiently reduce the operation drive force in time of filter operation and the supply pressure in time of washing.

The above description is made in relation to the external pressure type hollow fiber membrane module, but in the case of an internal pressure type hollow fiber membrane in which the raw water supply port is arranged at a lower end and an upper end of the cylindrical case, the raw water is introduced to the inner side of the hollow fiber membrane and the filtering is performed from the inner side towards the outer side of the hollow fiber membrane, and the filtrate water is discharged from a filtrate water discharge port arranged in the vicinity of the end of the cylindrical case and on the case side surface on the inner side than the adhered and fixed portion with respect to the axial direction of the cylindrical case, the problem in that the hollow fiber membrane is pushed by the flow of water and air trying to flow out and is pushed against the vicinity of the distribution hole of the inner wall of the distribution cylinder thereby blocking the distribution hole and causing pressure loss similarly occurs.

The problem of blocking of the distribution hole in time of discharge is difficult to solve with the related art described above.

Patent document 1: Japanese Laid-Open Utility Model No. 62-190605 (Claims)

Patent document 2: Japanese Laid-Open Patent Publication No. 2004-50023 (paragraphs [0016] to [0017])

DISCLOSURE OF THE INVENTION

Problems to be Solved by the Invention

It is an object of the present invention to provide a hollow fiber membrane module that solves the problems of the related art described above, and that can sufficiently reduce the pressure loss and the filter operation drive force.

Means for Solving the Problems

A hollow fiber membrane module of the present invention for achieving the above object has the following features.

(1) A hollow fiber membrane module in which a hollow fiber membrane bundle including a great number of hollow fiber membranes is arranged in a cylindrical case having a water entrance/exit opening formed on a side surface, and an end of the hollow fiber membrane bundle is adhered and fixed at an outer side in an axial direction of the cylindrical case than a position of the water entrance/exit opening at the side surface of the cylindrical case; wherein a distribution cylinder formed with a distribution hole is arranged on the inner side of the water entrance/exit opening at the side surface of the cylindrical case so as to surround an outer periphery of the hollow fiber membrane bundle, and a groove for communicating the distribution holes is arranged on a surface on the inner side of the distribution cylinder.

(2) A hollow fiber membrane module in which a hollow fiber membrane bundle including a great number of hollow fiber membranes is arranged in a cylindrical case having a water entrance/exit opening formed on a side surface, and an end of the hollow fiber membrane bundle is adhered and fixed at an outer side in an axial direction of the cylindrical case than a position of the water entrance/exit opening at the side surface of the cylindrical case; wherein a distribution cylinder formed with a distribution hole is arranged on the inner side of the water entrance/exit opening at the side surface of the cylindrical case so as to surround an outer periphery of the hollow fiber membrane bundle, and a corrugated protrusion is arranged on a surface on the inner side of the distribution cylinder.

(3) The hollow fiber membrane module according to (1) or (2), wherein a longitudinal direction of the groove or a longitudinal direction of the corrugated protrusion arranged on the surface on the inner side of the distribution cylinder is a direction intersecting a longitudinal direction of the hollow fiber membrane.

EFFECT OF THE INVENTION

According to the present invention, concentration of discharged water and air near the opening of the side surface that acts as the discharge exit when water and air in the module are discharged is alleviated, and the distribution hole formed in the distribution cylinder is prevented from being blocked by the hollow fiber membrane. As a result, the pressure loss in time of discharge is reduced, and the drive force in time of filter operation and the supply pressure in time of washing can be sufficiently reduced.

DESCRIPTION OF SYMBOLS

| | |
|---|---|
| 1: | cylindrical case |
| 2: | hollow fiber membrane bundle |
| 3: | case main body |
| 4a, 4b: | socket |
| 5a, 5b: | cap |
| 6a, 6b: | distribution cylinder |
| 7a, 7b: | annular flow path |
| 8a, 8b: | distribution hole |
| 9: | water discharge port (water entrance/exit opening) |
| 10: | water supply port (water supply opening) |
| 11: | filtrate water exit |
| 12: | bottom water passing port |
| 13a, 13b: | adhered and fixed portion |
| 13': | resin in adhered and fixed portion |
| 14: | through-hole |
| 15: | hollow fiber membrane |
| 16: | communication groove |
| 17: | corrugated protrusion |
| 61: | inner wall surface of distribution cylinder |
| 62: | outer wall surface of distribution cylinder |

BEST MODE FOR CARRYING OUT THE INVENTION

Figure 1:
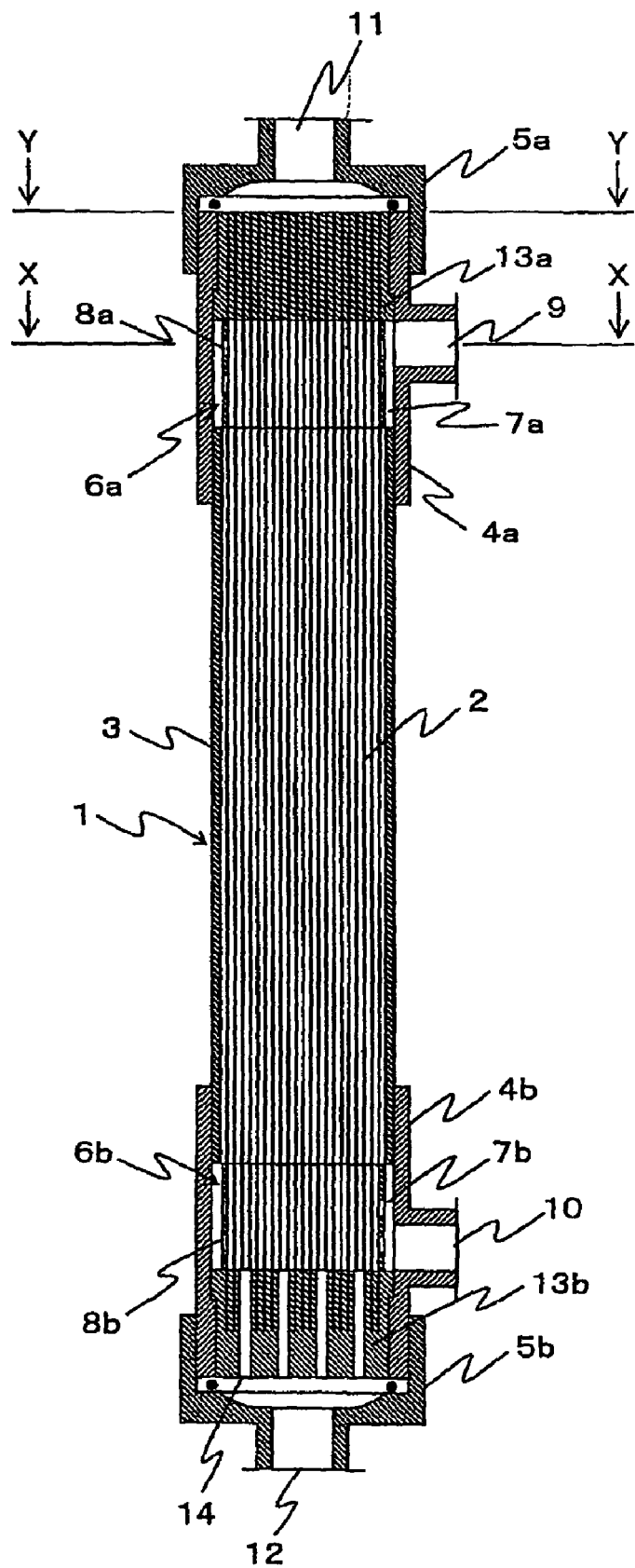
FIG. 1 is a schematic longitudinal cross sectional view showing one example of a hollow fiber membrane module applied with the present invention.

One embodiment of the present invention will be described below with reference to the drawings using a hollow fiber membrane module applied as a filter device of clean water by way of example. FIG. 1 is a schematic cross-sectional view showing one embodiment of the hollow fiber membrane module to which the present invention can be applied.

A cylindrical case 1 is configured by attaching sockets 4a, 4b to both ends of a cylindrical case main body 3, respectively. A water discharge port 9 for discharging raw water is arranged on a side surface of one socket 4a, and a water supply port 10 for supplying raw water is arranged on a side surface of the other socket 4b. A hollow fiber membrane bundle 2, which is cut at both ends to have a constant length, is inserted into the cylindrical case 1, and adhered and fixed portions 13a, 13b adhered and fixed by resin are formed at both ends. In FIG. 1, the hollow fiber membrane configuring the hollow fiber membrane bundle 2 is illustrated with a simple line, but actually, a great number of hollow fiber membranes considerably greater than the number of illustrated lines are bundled to configure the hollow fiber membrane bundle 2.

The resin raw material of the hollow fiber membrane configuring the hollow fiber membrane bundle 2 is not particularly limited, and may be polysulfone, polyether sulfone, polyacrylonitrile, polyimide, polyetherimide, polyamide, polyetherketone, polyether ether ketone, polyethylene, polypropylene, ethylene-vinyl alcohol copolymer, cellulose, cellulose acetate, polyvinylidene fluoride, ethylene-tetrafluoroethylene copolymer, polytetrafluoroethylene, and the like, and a complex resin raw material thereof. Among them, polyvinylidene fluoride is preferable as a raw material of the hollow fiber membrane as it excels in chemical resistance, so that the filtering performance of the hollow fiber membrane can be recovered by chemical washing the hollow fiber membrane on a regular basis, and the lifespan of the hollow fiber membrane module can be extended.

The outer diameter of the hollow fiber membrane is preferably in the range of between 0.3 and 3 mm. If the outer diameter of the hollow fiber membrane is too small, the hollow fiber membrane may break and be damaged, and problems such as degradation of the filtering performance may arise when handling the hollow fiber membrane in manufacturing the hollow fiber membrane module, when filtering using the hollow fiber membrane module, when washing the hollow fiber membrane module, and the like. If the outer diameter of the hollow fiber membrane is too large, on the other hand, the number of hollow fiber membranes that can be inserted to the cylindrical case of the same size decreases, and the filtering area reduces. Furthermore, the wall thickness of the hollow fiber membrane is preferably in the range of between 0.1 and 1 mm. If the wall thickness is too small, the hollow fiber membrane may brake by the pressure applied on the hollow fiber membrane in the module, whereas if the wall thickness is too large, the pressure drop increases, and great amount of membrane manufacturing material becomes necessary.

Figure 2:
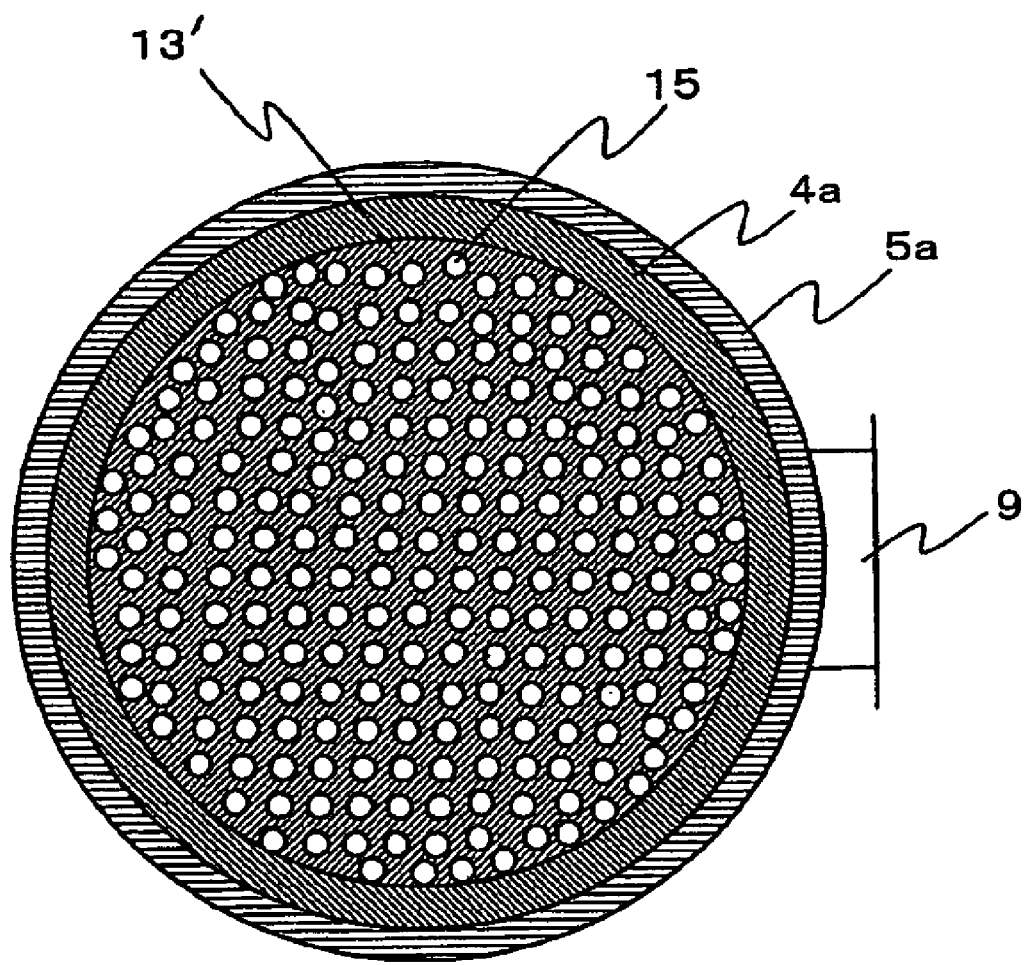
FIG. 2 is a schematic lateral cross-sectional view taken along line Y-Y of the hollow fiber membrane module in FIG. 1.

A cross-sectional view taken along line Y-Y in FIG. 1 is shown in FIG. 2. FIG. 2 is a cross-sectional view showing an end face facing the filtrate water exit 11 of the adhered and fixed portion 13a of the socket 4a and the hollow fiber membrane bundle 2.

At the adhered and fixed portion 13a on the socket 4a side facing the filtrate water exit 11 of the adhered and fixed portion of both ends of the hollow fiber membrane bundle 2 the individual hollow fiber membranes 15 are sealed with resin 13', as shown in FIG. 2, but the end of the hollow fiber membrane 15 is in the opened state without immersing the sealing resin 13 into the membrane. At the end (adhered and fixed portion 13b) of the hollow fiber membrane bundle 2 on the socket 4b side arranged with the raw water supply port, the sealing resin is immersed into the membrane at the end of the hollow fiber membrane for sealing. At the adhered and fixed portion 13b, the resin is also immersed between individual hollow fiber membranes for adhering and fixing, but a dispersion pin (not shown) and the like are interposed between the gap portion of the membranes when infiltrating resin, and the dispersion pin is removed after the resin cures to thereby form a through-hole 14.

Caps 5a, 5b are respectively attached to the outer end side of the sockets 4a, 4b respectively arranged at both ends of the cylindrical case 1. The filtrate water exit 11 is arranged at the cap 5a on the socket 4a side, and the bottom water passing port 12 is arranged at the cap 5b on the socket 4b side.

The distribution cylinders 6a, 6b are arranged on the interior of the sockets 4a, 4b corresponding to both ends of the cylindrical case 1 at the inner side than the adhered and fixed portions 13a, 13b with respect to the axial direction of the cylindrical case 1 at the position of the water entrance/exit opening (water discharge port 9 and water supply port 10) arranged on the side surface, and annular flow paths 7a, 7b are formed to surround the outer periphery thereof. Each annular flow path 7a, 7b is formed on the inner side of the sockets 4a, 4b, and is communicated to the water discharge port 9 and the water supply port 10, respectively. A great number of distribution holes 8a, 8b are formed in the distribution cylinder 6a, 6b to disperse and discharge the flow of raw water. The distribution holes 8a, 8b may be evenly arranged at a predetermined interval over substantially the entire surface of the distribution cylinder, but preferably, the distribution holes are not formed at the vicinity portion of the water entrance/exit opening (water discharge port 9 and water supply port 10) of the side surface and the distribution holes are evenly arranged at a predetermined interval at other portions, as shown in FIG. 3, FIG. 4, FIG. 12, and FIG. 21.

Figure 3:
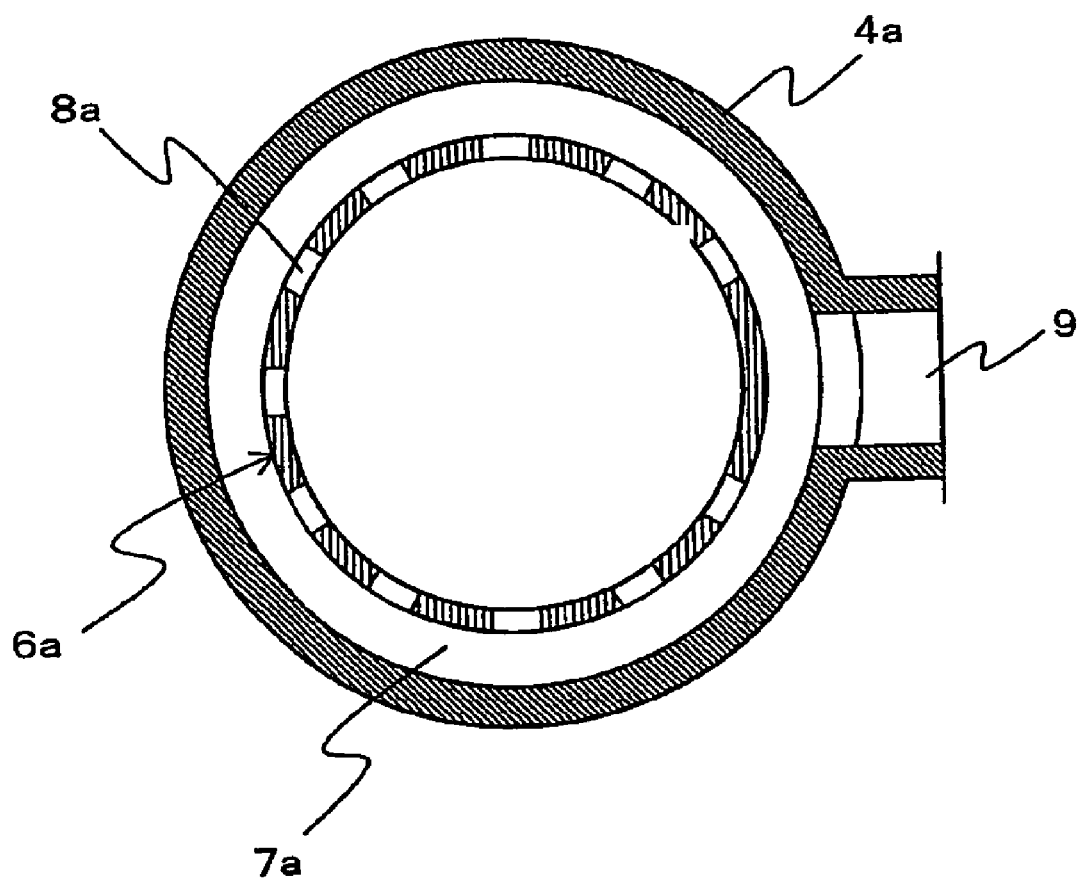
FIG. 3 is a schematic lateral cross-sectional view taken along line X-X of the hollow fiber membrane module in FIG. 1.
Figure 4:
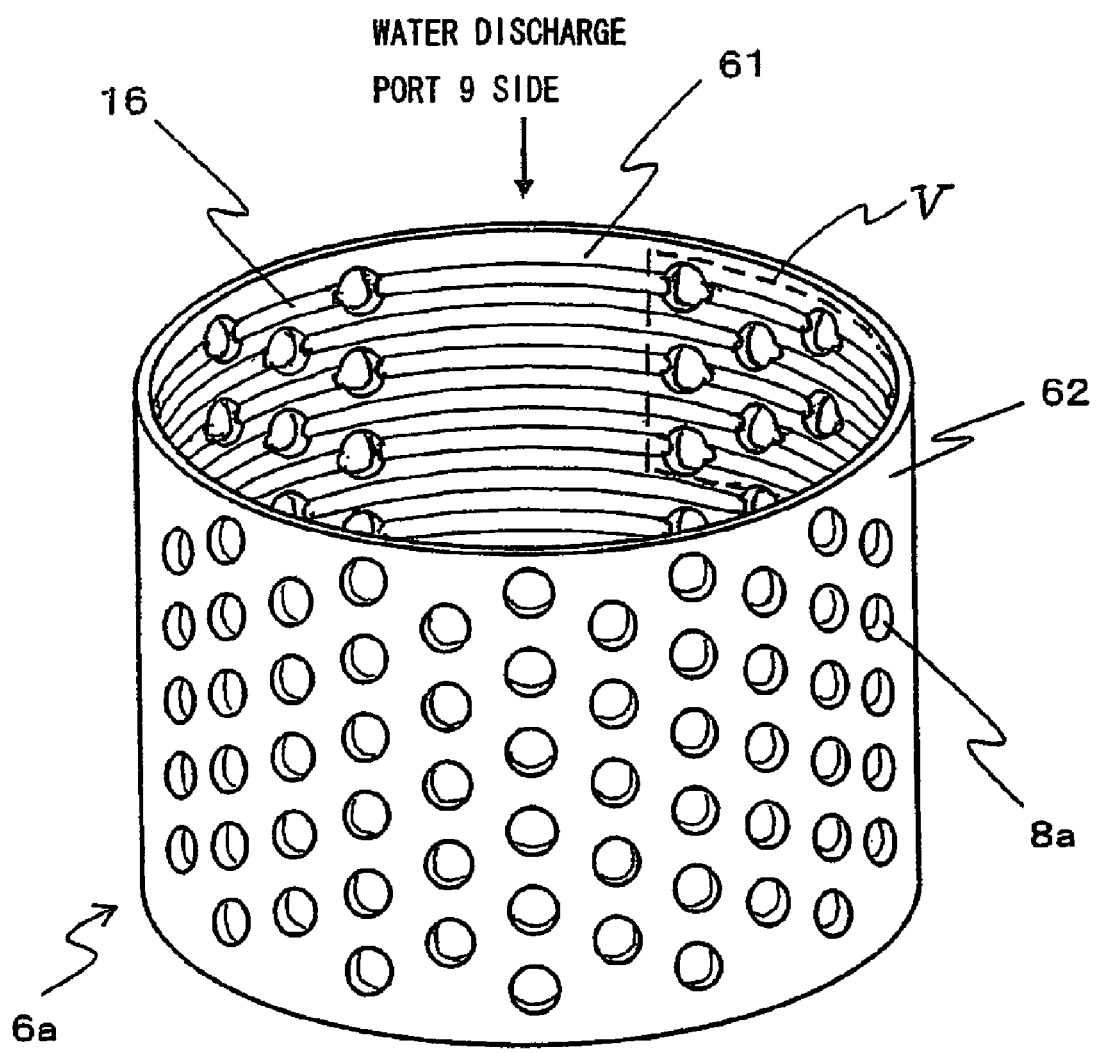
FIG. 4 is a schematic perspective view showing one example of a distribution cylinder used in the hollow fiber membrane module of the present invention.
Figure 12:
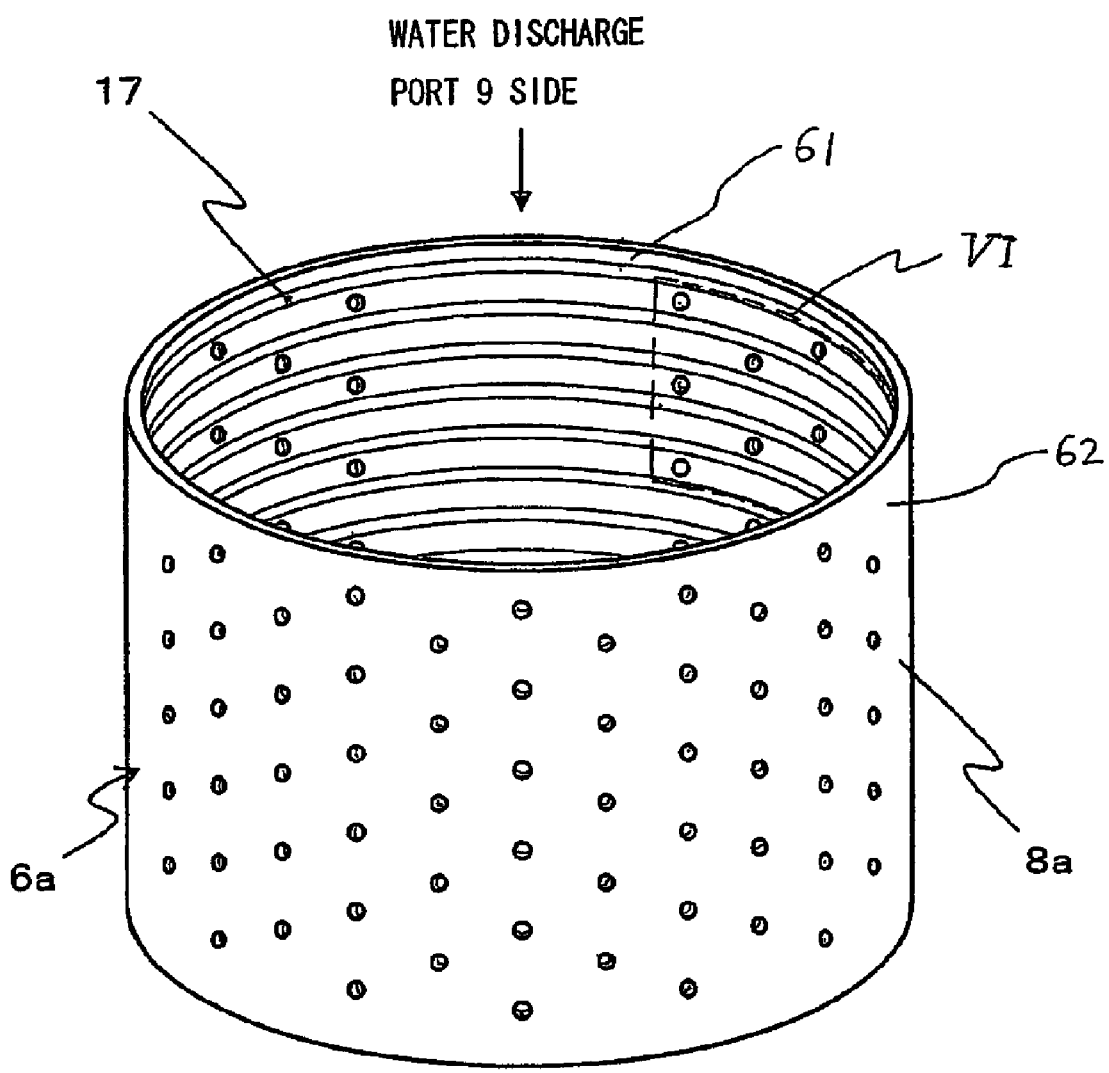
FIG. 12 is a schematic perspective view showing another example of the distribution cylinder used in the hollow fiber membrane module of the present invention.
Figure 21:
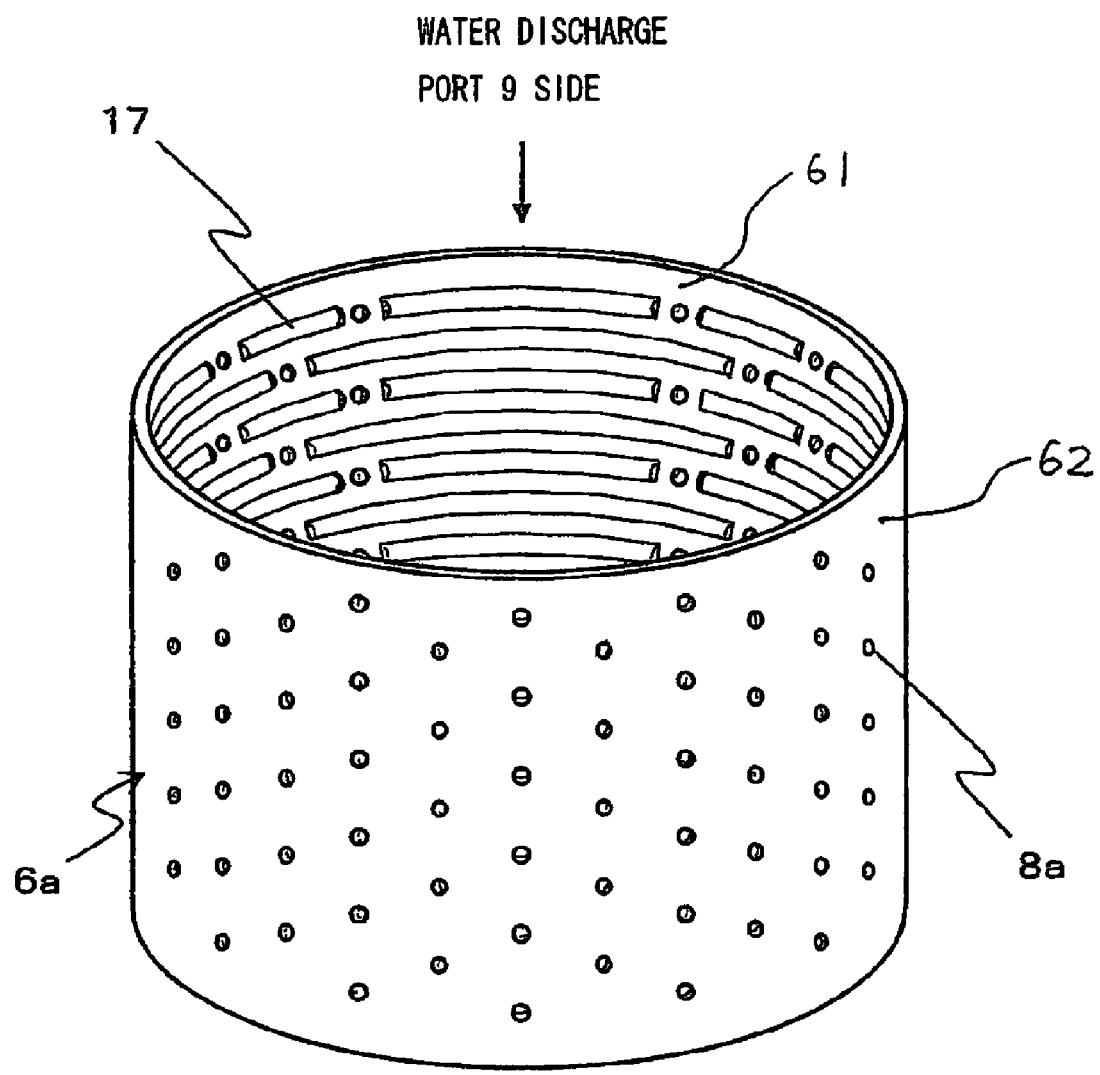
FIG. 21 is a schematic perspective view showing another example of the distribution cylinder used in the hollow fiber membrane module of the present invention.

The cross-sectional view taken along line X-X in FIG. 1 is shown in FIG. 3, and the perspective views in which the distribution cylinder 6a is schematically drawn are shown in FIG. 4, FIG. 12, and FIG. 21. In the distribution cylinder 6a, the distribution hole 8a is not formed at a portion facing the water discharge port 9, and thus such portion is in a blocked state where the water cannot pass therethrough.

The material of the case main body 3, the sockets 4a, 4b, the caps 5a, 5b, and the distribution cylinders 6a, 6b, may be polyolefin resin such as polyethylene, polypropylene, polybutene; fluorine-based resin such as polytetrafluoroethylene (PTFE), Tetrafluoroethylene perfluoroalkoxy vinyl ether copolymer (PFA), Tetrafluoroethylene and Hexafluoropropylene copolymer (FEP), Ethylene ethyl acrylate copolymer (ETFE), polychlorotrifluoroethylene (PCTFE), Polychlorotrifluoroethylene copolymer (ECTFE), and poly vinylidene fluoride (PVDF); chlorine-based resin such as poly vinyl chloride and poly vinylidene chloride; resin such as polysulfone resin, polyether sulfone resin, polyarylsulfone resin, polyphenylether resin, Acrylonitrile-Butadiene-Styrene copolymer resin (ABS), Acrylonitrile-Styrene copolymer resin (AS), polyphenylenesulfide resin, polyamide resin, polycarbonate resin, polyetherketone, and polyether ether ketone; which may be used alone or as a mixture. Metal such as aluminum and stainless steel may be used other than resin. A complex of resin and metal, complex material such as glass fiber reinforce resin and carbon fiber reinforced resin may be used. The case main body 3, the sockets 4a, 4b, the caps 5a, 5b and the distribution cylinders 6a, 6b may be made of the same material, or may be made of different materials.

A case of performing the filter processing of the raw water by the external pressure type with the hollow fiber membrane module having the above-described device configuration will be described below.

The raw water is supplied from the water supply port 10 or the bottom water passing port 12 positioned at a lower part of the module. When the raw water is supplied from the water supply port 10 of a lower side surface, the raw water passes from the annular flow path 7b through the distribution hole 8b of the distribution cylinder 6b and enters an outer side region of the hollow fiber membrane bundle 2, and then penetrates through the membrane wall of the hollow fiber membrane and immerses into the membrane. The filtrate water infiltrated into the membrane is collected into the cap 5a from an opening end face at an upper end of the hollow fiber membrane, and taken out from the filtrate water exit 11. When raw water is supplied from the bottom water passing port 12 at the bottom of the module, the raw water passes through the through-hole 14 formed in the adhered and fixed portion 13b and enters the outer side region of the hollow fiber membrane bundle 2, and then is filtered at the membrane wall of the hollow fiber membrane, passed through the interior of the hollow fiber membrane and the interior of the cap 5a, and then is taken out from the filtrate water exit 11, similar to the above.

When filter processing the raw water through the total-amount filtering method, the raw water is not discharged from the water discharge port 9 since the water discharge port 9 is closed, but when filter processing the raw water through the cross-flow method, the residual raw water that did not penetrate the hollow fiber membrane passes through the distribution cylinder 6a on the downstream side, and is discharged from the water discharge port 9 through the annular flow path 7a. In such hollow fiber membrane module, the raw water is supplied from the water supply port 10 or the bottom water passing port 12 before starting the filtering operation, and the raw water is flowed out from the water discharge port 9 same as when filter processing the raw water through the cross flow method, to thereby fill the interior of the filter region of the module with raw water.

If the conventional hollow fiber membrane module device where grooves nor corrugated protrusions are not formed on the inner surface of the distribution cylinder is used, when the raw water of the outer side region of the hollow fiber membrane bundle 2 is passed through the distribution hole 8a from the inner side of the distribution cylinder 6a, and discharged from the water discharge port 9 through the annular flow path 7a, the hollow fiber membrane positioned on the inner side near the distribution cylinder 6a is pushed by the flow of discharged water if the amount of discharged water per unit time is too large, and is pushed against the vicinity of the distribution hole 8a, whereby the distribution hole 8a is easily blocked.

When washing the hollow fiber membrane after the termination of the filtering process of a constant time, backflow washing of supplying the filtrate water or the high pressure air from the filtrate water exit 11 into the module, and flowing the hollow fiber membrane from the inner side to the outer side to wash the membrane surface, and air scrubbing of supplying the raw water mixed with high pressure air or only the high pressure air from the water supply port 12, and discharging the suspended matters accumulated in the module are performed, where the backflow washing and the air scrubbing may be simultaneously performed. The wash wastewater and waste gas are flowed out from the water discharge port 9 even when performing such washing, and thus the hollow fiber membrane is pushed against the vicinity of the distribution hole 8a and the distribution hole 8a tends to be easily blocked, similar to the above.

In the hollow fiber membrane module of the present invention, however, a groove 16 for communicating the distribution holes 8a is formed at the inner wall of the distribution cylinder 6a. In addition to or in place thereof, a corrugated protrusion 17 is arranged between the distribution holes 8a. The problem of blocking of the distribution hole is resolved by the communication groove 16 and the corrugated protrusion 17. The shape of the communication groove 16 and the shape of the corrugated protrusion 17 are hereinafter described in detail.

One embodiment of the distribution cylinder 6a used in the hollow fiber membrane module of the present invention is illustrated in FIG. 4 (perspective view), FIG. 12 (perspective view), and FIG. 21 (perspective view). In FIG. 4, the groove 16 for communicating the distribution holes 8a is formed on a surface on the inner side (inner wall surface 61). In FIG. 12 and FIG. 21, the corrugated protrusion 17 is arranged on the surface on the inner side (inner wall surface 61).

Figure 5:
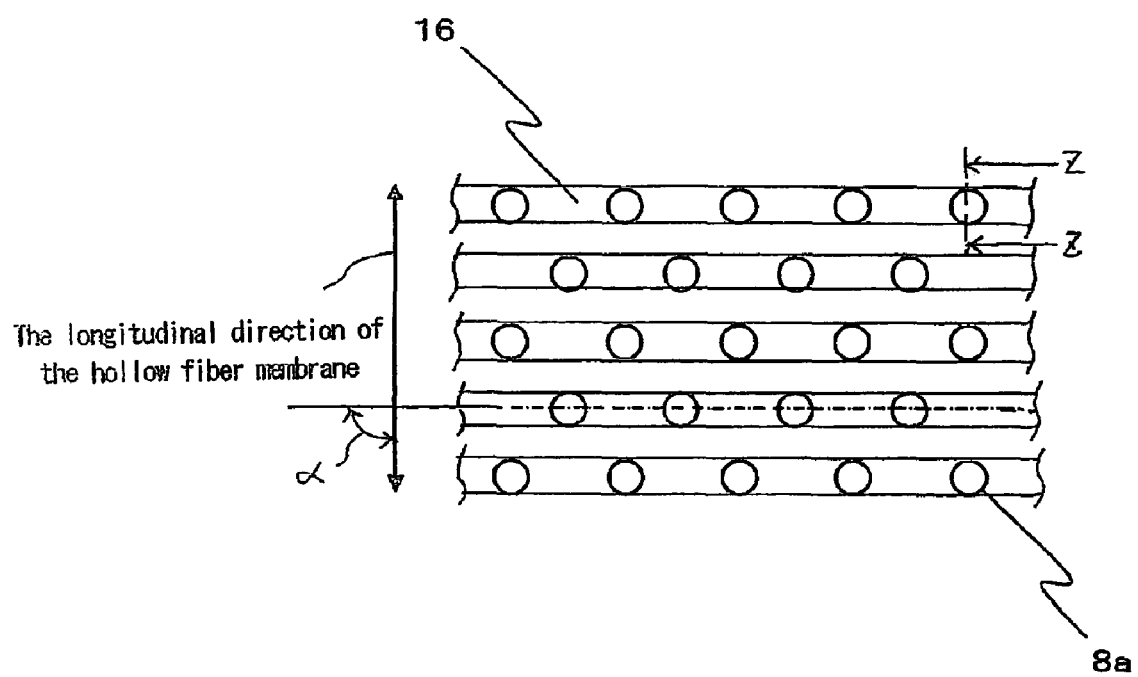
FIG. 5 is a schematic view of an inner wall surface showing one example of a positional relationship of a distribution hole and a communication groove at the inner wall surface of the distribution cylinder used in the present invention.

A partial enlarged view seen from the inner side of one portion (portion of reference number V) of the surface on the inner side of the distribution cylinder of FIG. 4 is shown in FIG. 5. As shown in FIG. 5, the groove 16 communicating the distribution holes 8a is formed on the inner side surface of the distribution cylinder 6a. As such distribution holes 8a are communicated with the groove, even if the hollow fiber membrane is pushed by the flow of discharged water and air, and pushed against the vicinity of the distribution hole 8a, the discharged water and air flow to another distribution hole 8a and then is collected and discharged, whereby the pressure loss can be suppressed, and increase in the operation power can be suppressed.

Figure 6:
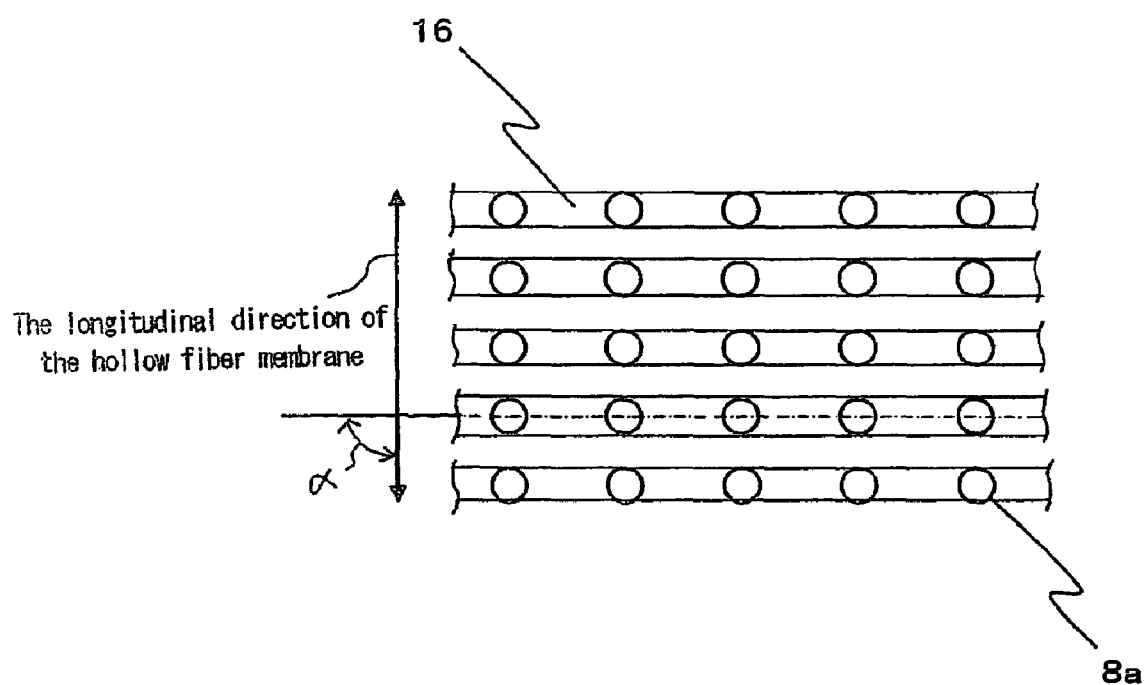
FIG. 6 is a schematic view of an inner wall surface showing another example of a positional relationship of the distribution hole and the communication groove at the inner wall surface of the distribution cylinder.

In the case of FIG. 5, the great numbers of distribution holes 8a are arranged in a staggered manner, but the arrangements of the distribution holes are not particularly limited, and the great number of distribution holes 8a may be arranged in a grid form, as shown in FIG. 6. All the distribution holes 8a do not need to be communicated with the communication groove 16, but the communication groove 16 needs to be communicated to the distribution hole 8a. The communication of the communication groove 16 and the distribution hole 8a is preferably communication such that the communication groove 16 extends in a longitudinal direction traversing the distribution hole 8a, as shown in FIG. 4 to FIG. 8, but may be in communication other than that as illustrated as long as the communication groove 16 is communicated at any position of a hole periphery of the distribution hole. For instance, the hole center line in the array direction of the distribution hole 8a and the groove width center line of the communication groove may be shifted in the up and down direction, where the groove may be communicated only at an upper part of the distribution hole (not shown), or the groove may be communicated only at a lower part of the distribution hole (not shown).

The communication groove 16 arranged on the surface on the inner side of the distribution cylinder is arranged such that its longitudinal direction is in a direction of intersecting the longitudinal direction of the hollow fiber membrane. In the present invention, the longitudinal direction of the hollow fiber membrane refers to the longitudinal direction of the hollow fiber membrane bundle when the hollow fiber membrane bundle is inserted into the cylindrical case and installed at a predetermined position.

Figure 7:
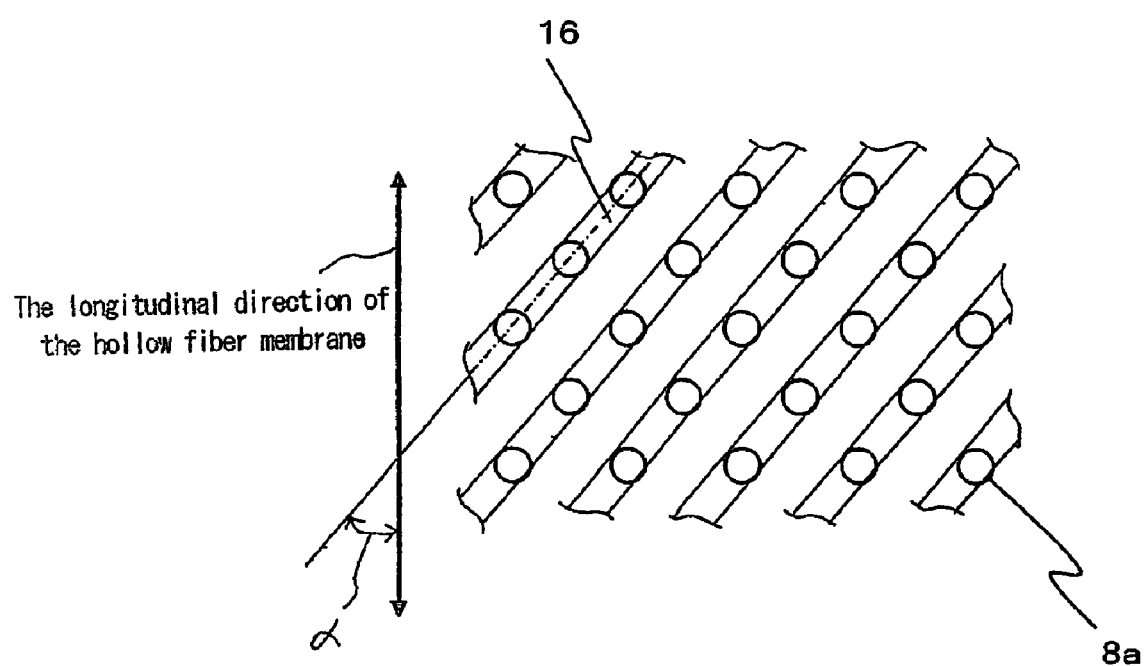
FIG. 7 is a schematic view of an inner wall surface showing another example of a positional relationship of the distribution hole and the communication groove at the inner wall surface of the distribution cylinder.
Figure 8:
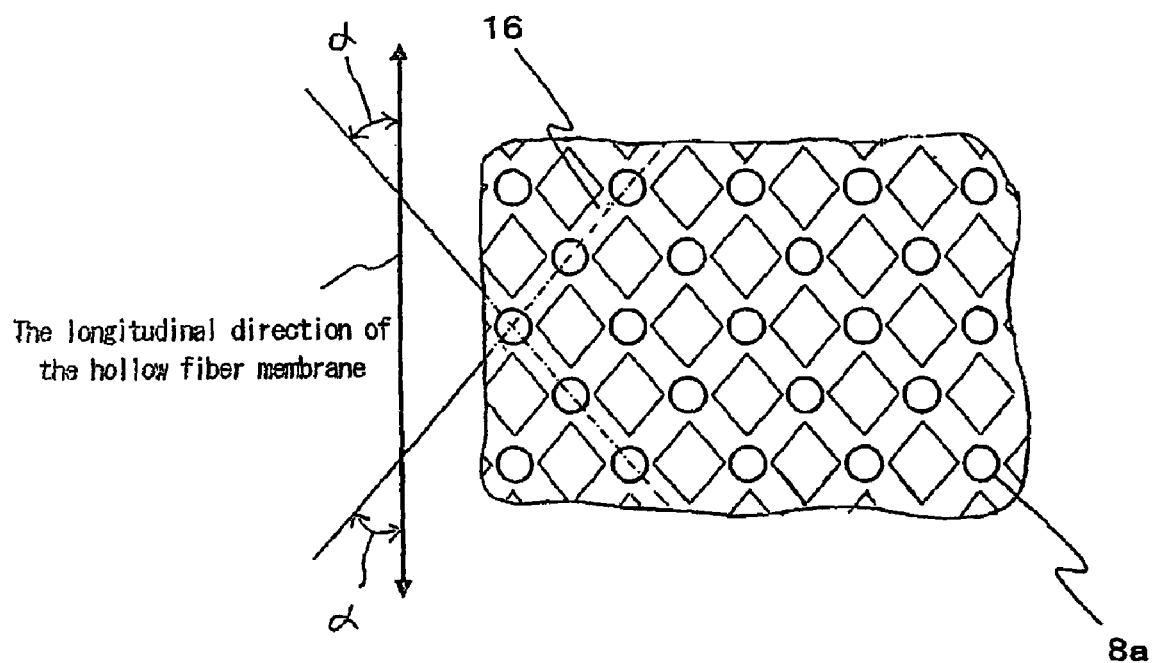
FIG. 8 is a schematic view of an inner wall surface showing another example of a positional relationship of the distribution hole and the communication groove at the inner wall surface of the distribution cylinder.

The intersecting angle α of the longitudinal direction of the communication groove 16 with respect to the longitudinal direction of the hollow fiber membrane is preferably about a right angle (about 90 degrees) as in the case of FIG. 5 and FIG. 6 so that the distance reaching to the adjacent distribution hole 8a can be reduced, but may extend in a diagonal direction so as to intersect the longitudinal direction of the hollow fiber membrane at greater than or equal to 30 degrees and smaller than 90 degrees as in the communication groove 16 of FIG. 7 and FIG. 8.

Except a continuously extending groove as shown in the figure, the communication groove may be a discontinuously extending groove as long as the desired effects of the present invention can be exhibited. The groove may be linearly extended as shown in the figure, but may be extended in a curve or a folded line. If extending in a curve or a folded line, it merely needs to intersect at greater than or equal to 30 degrees with respect to the longitudinal direction of the hollow fiber membrane at most portions.

As in the case of FIGS. 5 to 7, the plurality of communication grooves 16 are preferably arranged on the surface on the inner side of the distribution cylinder, and the longitudinal direction of the plurality of communication grooves are substantially parallel to each other so that the number of grooves can be reduced, but may be arranged such that the longitudinal direction of the plurality of communication grooves 16 intersect each other as in the case of FIG. 8. When the longitudinal directions of the communication grooves intersect each other, the longitudinal directions of the grooves may be line symmetric (case of FIG. 8) with respect to the longitudinal direction of the hollow fiber membrane, but may not be line symmetric. However, if the intersecting angle α of the longitudinal direction of the communication groove 16 with respect to the longitudinal direction of the hollow fiber membrane is too small, both directions become close to parallel, and the hollow fiber membrane tends to easily fall into the communication groove, and thus the intersecting angle α with respect to the longitudinal direction of the hollow fiber membrane is preferably greater than or equal to 30 degrees. The upper limit value thereof is 90 degrees in a case of intersecting at right angle.

As in the case shown in FIGS. 5 to 8, the width of the communication groove 16 is particularly preferably to be substantially equal to the hole diameter of the distribution hole 8a so that the flow resistance in the groove can be reduced, but may be a groove width of about 50 to 125% of the hole diameter of the distribution hole.

Figure 9:
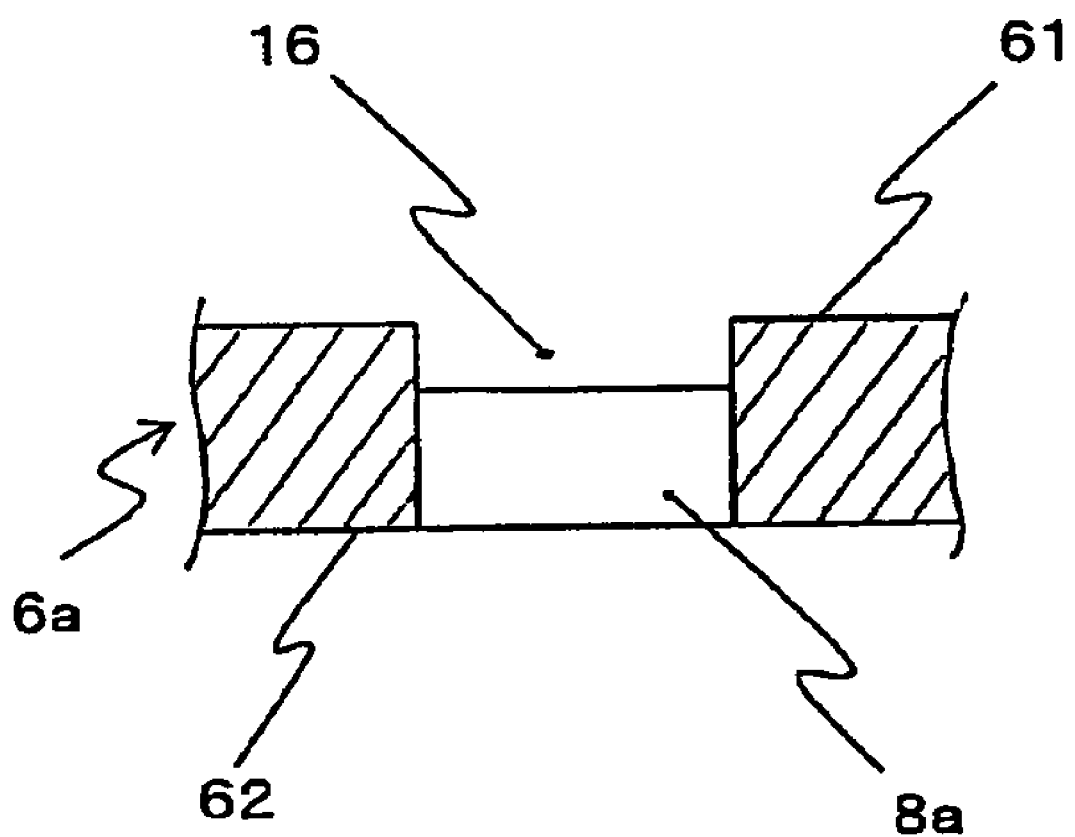
FIG. 9 is a schematic cross-sectional view showing one example of a cross-sectional shape of the communication groove of the wall surface of the distribution cylinder.
Figure 10:
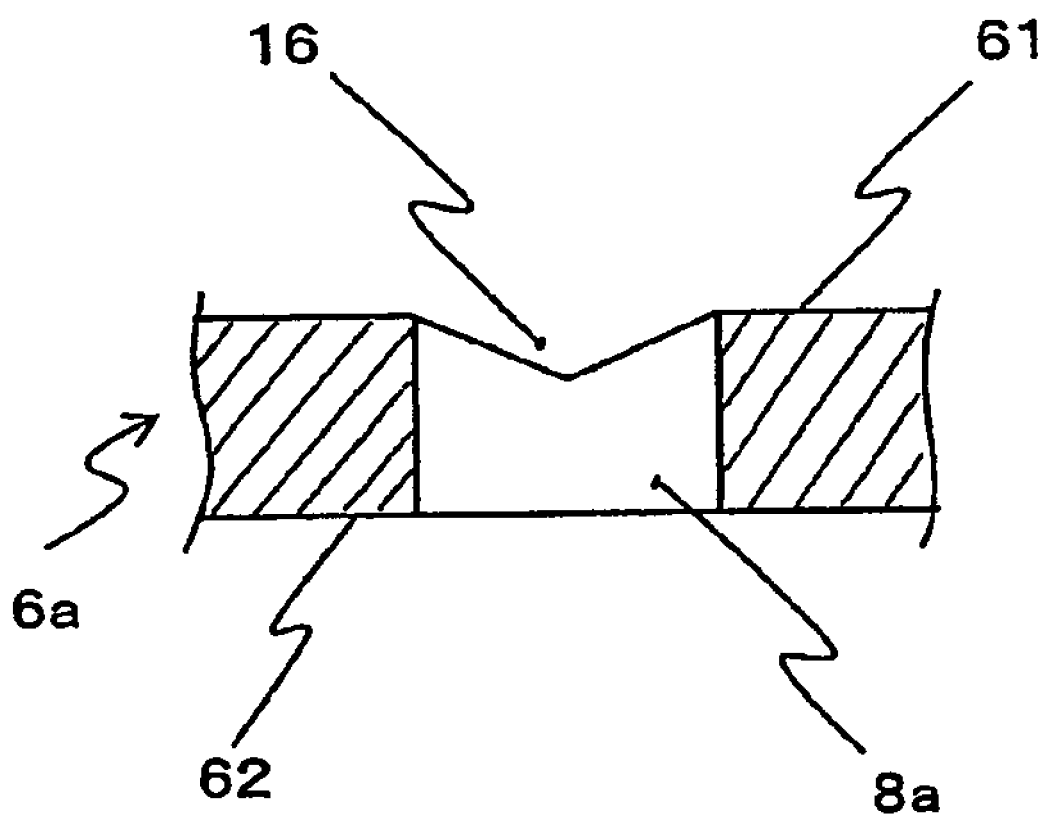
FIG. 10 is a schematic cross-sectional view showing another example of the cross-sectional shape of the communication groove of the inner wall surface of the distribution cylinder.
Figure 11:
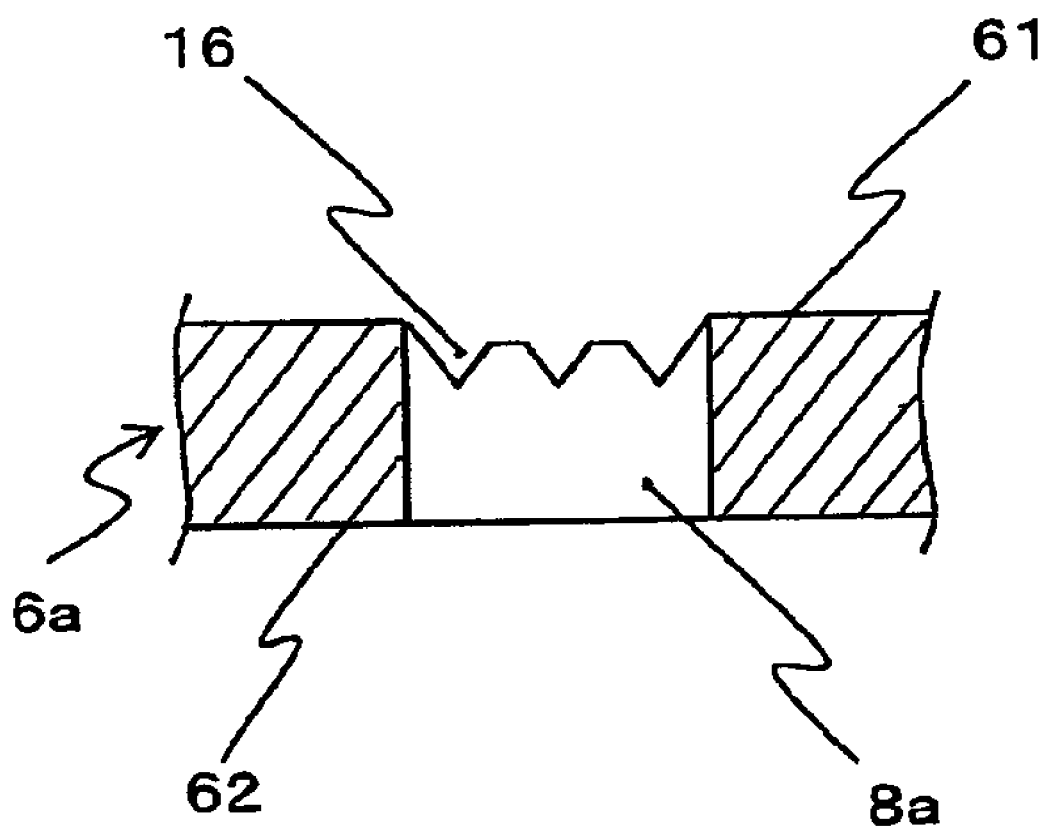
FIG. 11 is a schematic cross-sectional view showing another example of the cross-sectional shape of the communication groove of the inner wall surface of the distribution cylinder.

The cross sectional view taken along line Z-Z in FIG. 5 is shown in FIG. 9 to FIG. 11 to illustrate the cross-sectional view of the communication groove 16. In FIG. 9 to FIG. 11, the distribution hole 8a is a columnar hole passing through from the inner wall surface 61 to the outer wall surface 62 of the distribution hole, and the groove 16 is arranged communicating to the distribution hole 8a. The cross-sectional shape of the communication groove 16 may be a rectangle as in FIG. 9, a V-shape as in FIG. 10, or a groove shape in which a plurality of V-shapes are connected as in FIG. 11. Problems do not arise even with the groove shape of a semicircle or a trapezoid, and may be of any groove shape as long as the water can flow. Corner portions of the groove cross-sectional shape can be processed so as to be gradual. If a plurality of groove shapes is formed in one groove 16 as in FIG. 11, the space between the groove shapes is not a sharp shape, and a distal end is preferably grounded to a trapezoidal shape or other shapes such as a circular shape so that the hollow fiber membrane is prevented from scratches.

The depth of the communication groove 16 is preferably deep as the water flow resistance in the groove becomes small, but is preferably a depth of smaller than or equal to ½ of the thickness of the distribution cylinder 6a as the strength of the distribution cylinder 6a itself becomes weak if too deep. The depth of the groove is preferably greater than or equal to 10% of the thickness of the distribution cylinder 6a to ensure the flow of water in the groove.

Moreover, the distribution cylinder 6a used in the hollow fiber membrane module of the present invention may be arranged with the corrugated protrusion 17 at the surface (inner wall surface 61) on the inner side of the distribution cylinder 6a in place of the communication groove 16 or in addition to the communication groove 16. The case of arranging the corrugated protrusion will be described in detail below along FIG. 12 to FIG. 21. FIG. 12 (perspective view of distribution cylinder) is basically the same as the distribution cylinder shown in FIG. 4 except that the corrugated protrusion 17 extending in the horizontal direction between the distribution hole and the distribution hole is arranged in place of the communication groove 16. FIG. 21 (perspective view of distribution cylinder) is basically the same as the distribution cylinder shown in FIG. 12 except that the position and the length of the corrugated protrusion are different. The corrugated protrusion 17 is made such that the projection continuously extends as in a ridge, but may be a discontinuously extending ridge as shown in FIG. 12 as long as the desired effects of the present invention can be exhibited. The ridge may linearly extend as shown in the figure, but may be extended in a curve or a folded line. If extending in a curve or a folded line, it merely needs to intersect at greater than or equal to 30 degrees with respect to the longitudinal direction of the hollow fiber membrane at most portions.

Figure 13:
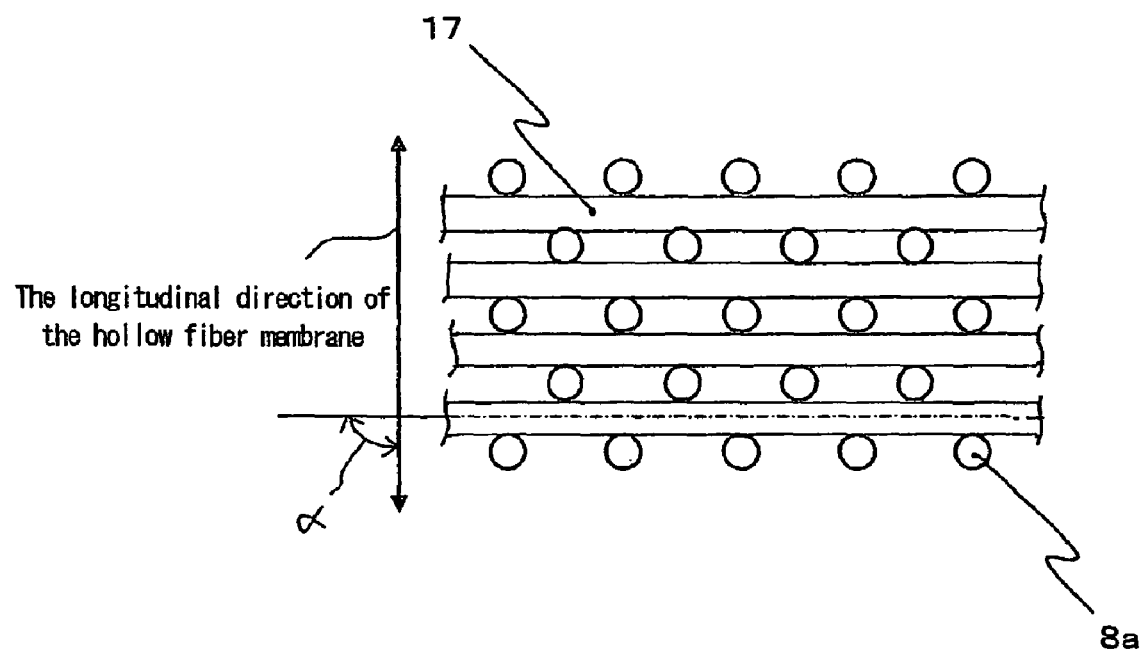
FIG. 13 is a schematic view of an inner wall surface showing one example of a positional relationship of the distribution hole and a corrugated protrusion at the inner wall surface of the distribution cylinder used in the present invention.

An enlarged view seen from the inner side of the portion (portion of reference number VI of FIG. 12) of the surface on the inner side of the distribution cylinder 6a arranged with the corrugated protrusion 17 is shown in FIG. 13. In the case of FIG. 13, the corrugated protrusion 17 continuously extending in the horizontal direction is arranged at a position between lines connecting the positions of the distribution holes 8a on the inner side surface of the distribution cylinder 6a in the horizontal direction. With the arrangement of such corrugated protrusion 17, even if the hollow fiber membrane is pushed by the flow of discharged water and air, and pushed against the vicinity of the distribution hole 8a, the hollow fiber membrane is supported by the corrugated protrusion 17 so as to be prevented from falling or closely attaching to the distribution hole 8a. As a result, the flow path of water to the distribution hole 8a is ensured, the pressure loss is suppressed, and increase in the operation power is suppressed.

Figure 14:
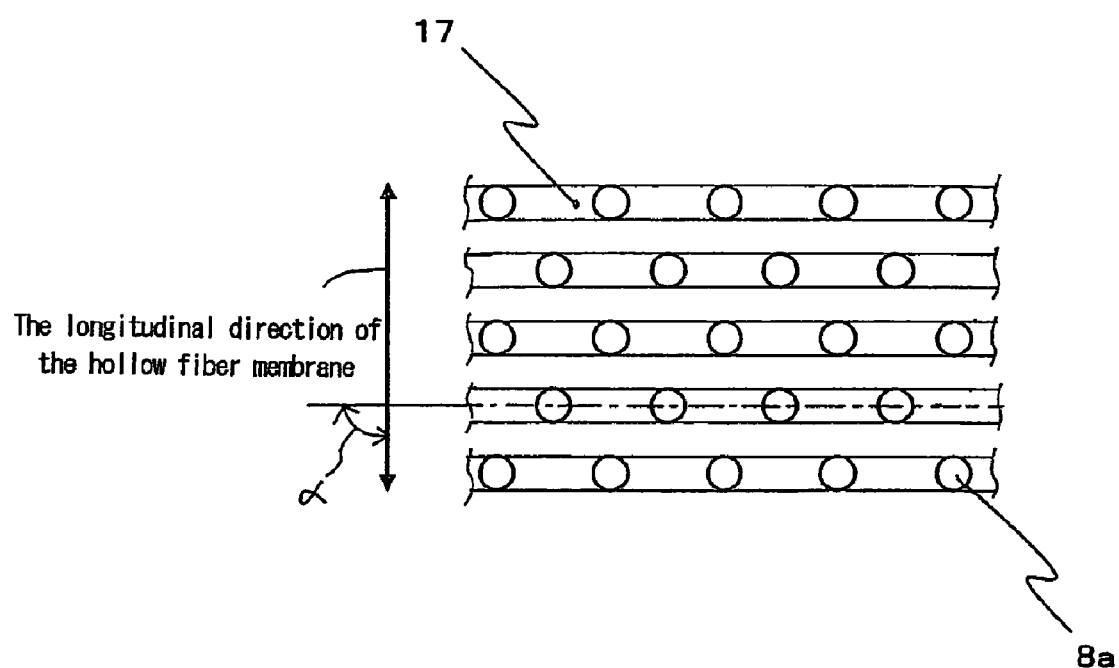
FIG. 14 is a schematic view of an inner wall surface showing another example of a positional relationship of the distribution hole and the corrugated protrusion at the inner wall surface of the distribution cylinder.

As shown in FIG. 14, the corrugated protrusion 17 may be arranged at a position other than the distribution hole 8 on the line connecting the positions of the distribution holes 8a in the horizontal direction. In this case, the corrugated protrusion 17 is extended in the horizontal direction while being divided by the distribution hole 8a, but has a width such that the entire hole periphery of the distribution hole 8a is not surrounded by the corrugated protrusion 17.

Figure 15:
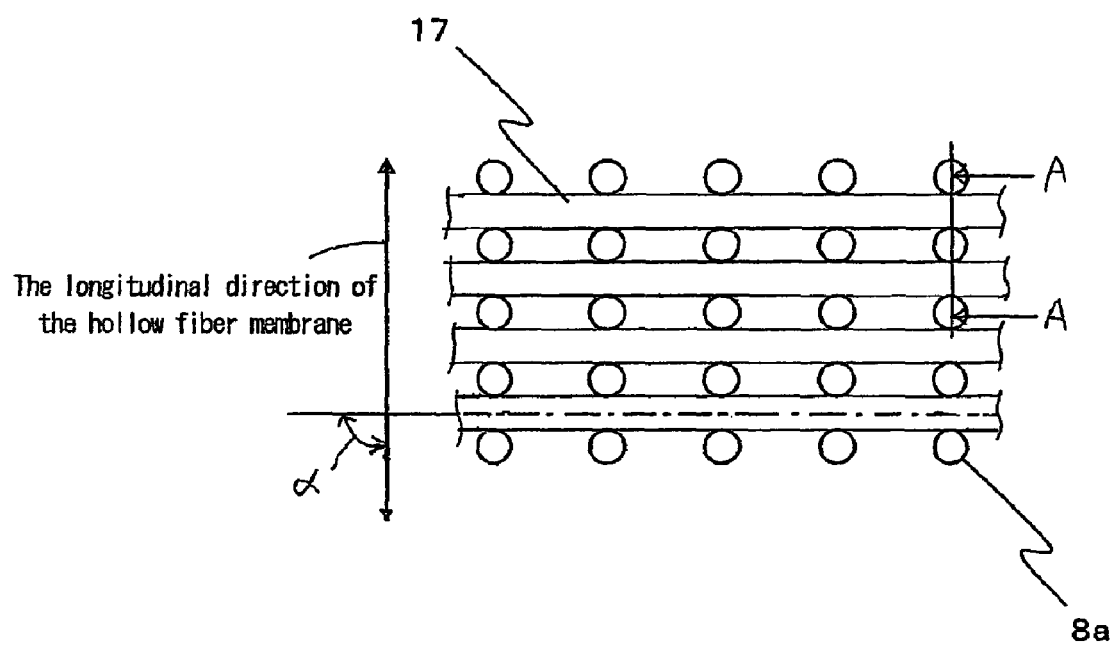
FIG. 15 is a schematic view of an inner wall surface showing another example of a positional relationship of the distribution hole and the corrugated protrusion at the inner wall surface of the distribution cylinder.

If the great number of distribution holes 8a is arranged in a staggered manner or a grid form, as shown in FIG. 13 and FIG. 15, the corrugated protrusion 17 is preferably arranged on a line continuously extending in the horizontal direction at a position between the lines connecting the positions of the distribution holes 8a in the horizontal direction. In this case, as shown in FIG. 13 and FIG. 15, the width of the corrugated protrusion may be made such that an upper end and a lower end of the distribution hole 8a contact a lower end and an upper end of the corrugated protrusion 17, respectively, or the width of the corrugated protrusion may be made such that contact does not occur as in FIG. 16. The corrugated protrusion 17 may be a discontinuously extending line while being divided into plurals in the peripheral direction (horizontal direction) of the distribution cylinder 6a.

The corrugated protrusion 17 arranged on the surface on the inner side of the distribution cylinder is arranged such that the longitudinal direction is a direction intersecting the longitudinal direction of the hollow fiber membrane. The intersecting angle α of the corrugated protrusion 17 with respect to the longitudinal direction of the hollow fiber membrane is preferably about a right angle (about 90 degrees) as in the case of FIG. 13 to FIG. 15, but may extend in a diagonal direction so as to intersect the longitudinal direction of the hollow fiber membrane at greater than or equal to 30 degrees and smaller than 90 degrees as in FIG. 16 and FIG. 17.

Figure 16:
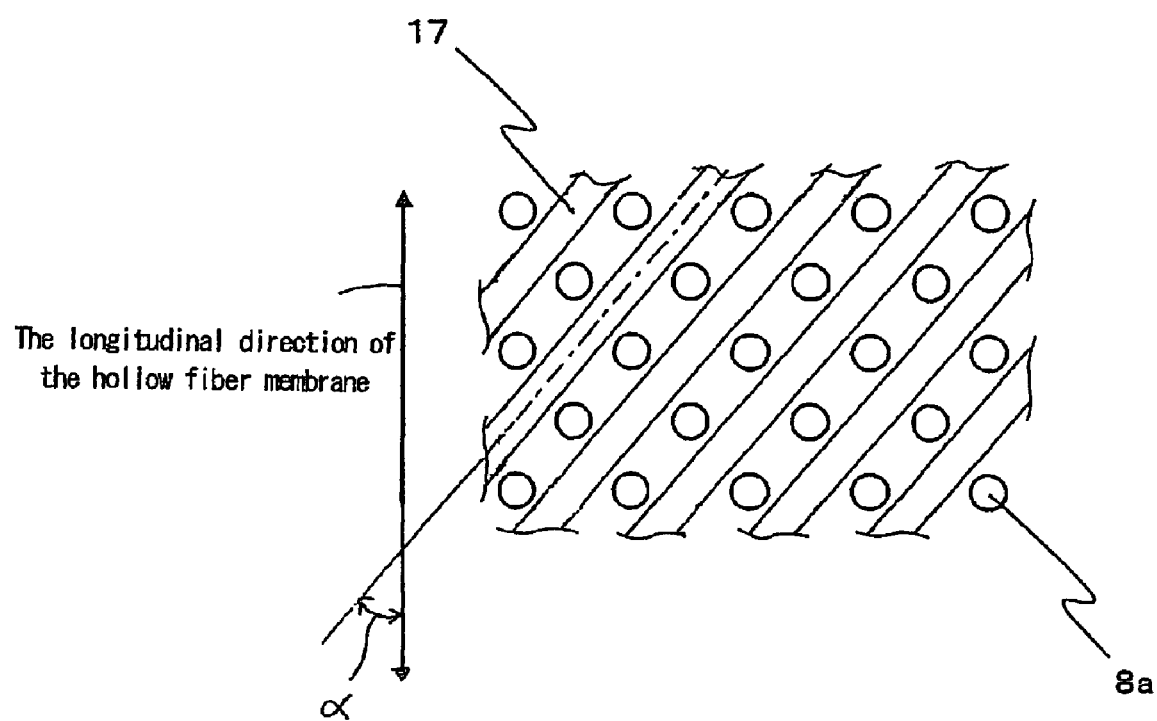
FIG. 16 is a schematic view of an inner wall surface showing another example of a positional relationship of the distribution hole and the corrugated protrusion at the inner wall surface of the distribution cylinder.
Figure 17:
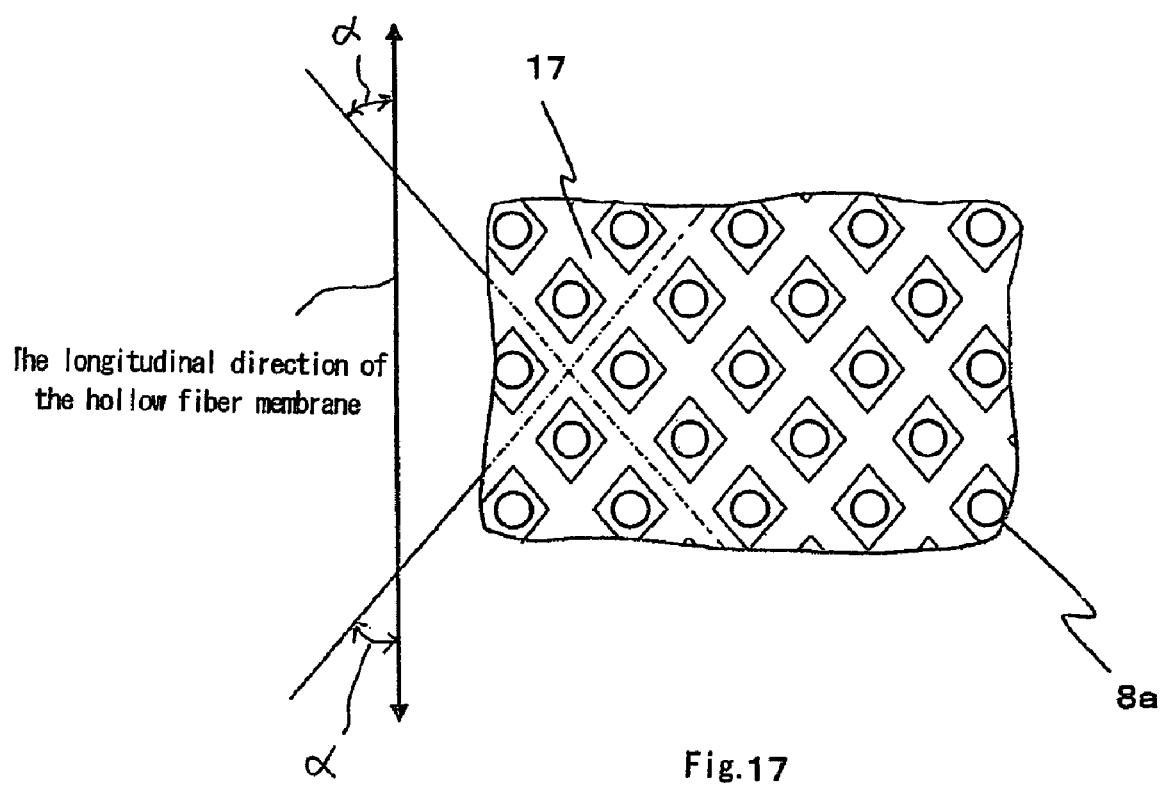
FIG. 17 is a schematic view of an inner wall surface showing another example of a positional relationship of the distribution hole and the corrugated protrusion at the inner wall surface of the distribution cylinder.

As in the case of FIGS. 13 to 16, the plurality of corrugated protrusions are preferably arranged on the surface on the inner side of the distribution cylinder, and the longitudinal direction of the plurality of corrugated protrusions are substantially parallel to each other so that the number of corrugated protrusions can be reduced, but may be arranged such that the longitudinal direction of the plurality of corrugated protrusions intersect each other as in the case of FIG. 17. When the longitudinal directions of the corrugated protrusions intersect each other, the longitudinal directions of the corrugated protrusions may be line symmetric (case of FIG. 17) with respect to the longitudinal direction of the hollow fiber membrane, but may not be line symmetric. However, if the intersecting angle α of the longitudinal direction of the corrugated protrusions with respect to the longitudinal direction of the hollow fiber membrane is too small, both directions become close to parallel, and the hollow fiber membrane tends to easily fall into a valley portion between the corrugated protrusions 17, and thus the intersecting angle α with respect to the longitudinal direction of the hollow fiber membrane is preferably greater than or equal to 30 degrees. The upper limit value thereof is 90 degrees in a case of intersecting at right angle.

Figure 18:
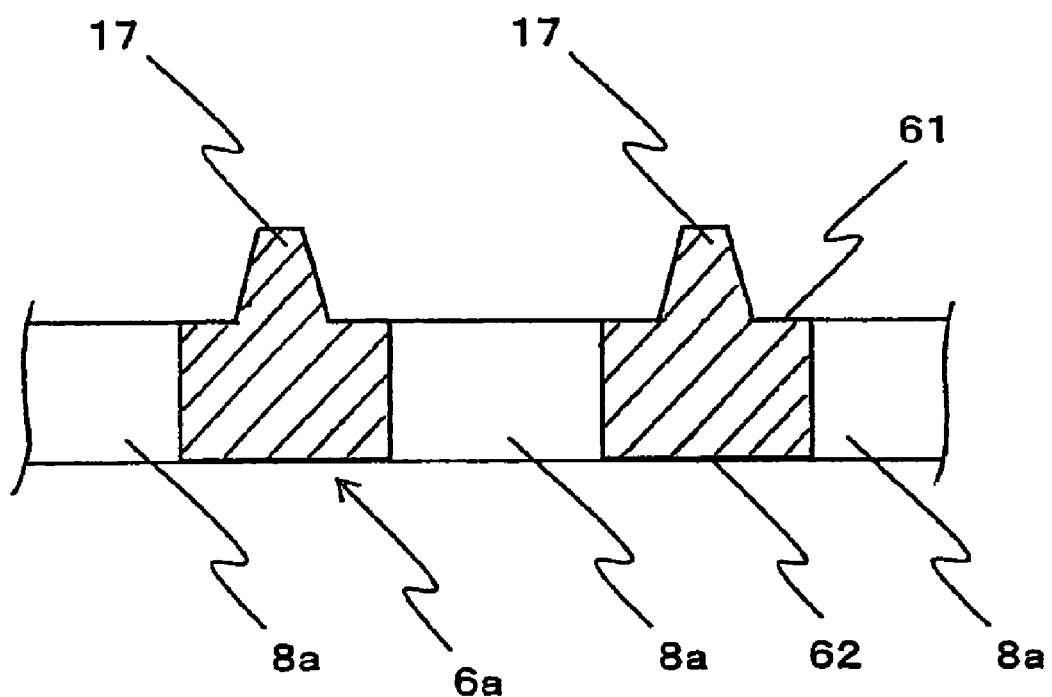
FIG. 18 is a schematic cross-sectional view showing one example of the cross-sectional shape of the corrugated protrusion of the inner wall surface of the distribution cylinder.
Figure 19:
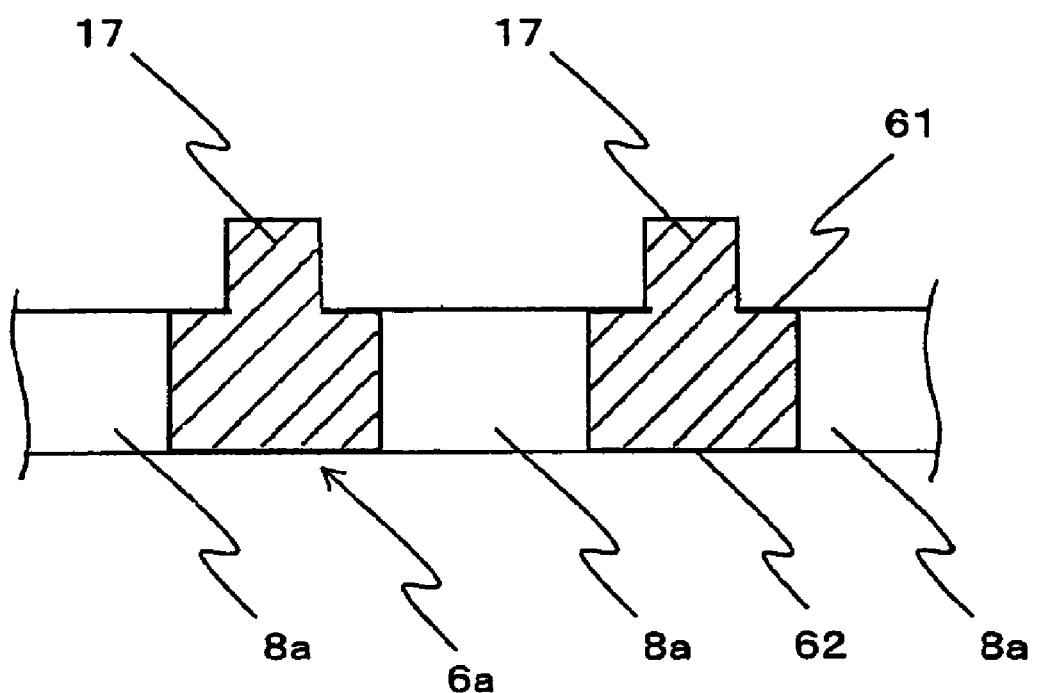
FIG. 19 is a schematic cross-sectional view showing another example of the cross-sectional shape of the corrugated protrusion of the inner wall surface of the distribution cylinder.

If the projection cross-sectional shape of the corrugated protrusion 17 is a trapezoid or a square as in FIG. 18 and FIG. 19, the width of an upper surface of the projection is preferably narrow as the flow path to the distribution hole 8a can be ensured, and pressure loss as well as increase in operation power can be suppressed, but is preferably greater than or equal to 1 mm as the hollow fiber membrane is easily damaged if too narrow.

Figure 20:
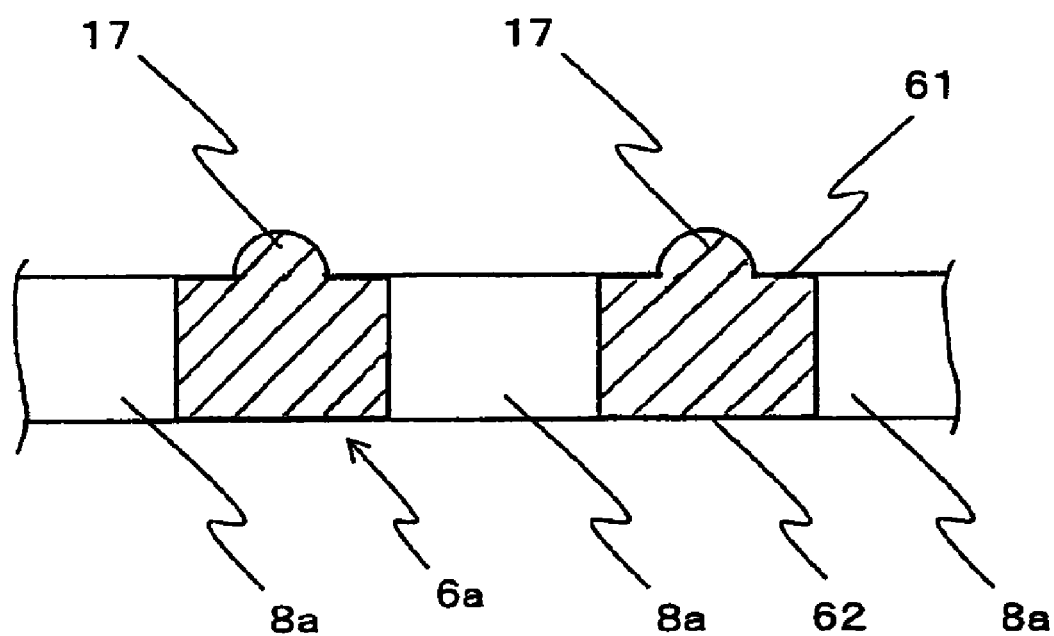
FIG. 20 is a schematic cross-sectional view showing another example of the cross-sectional shape of the corrugated protrusion of the inner wall surface of the distribution cylinder.

A cross sectional view taken along line A-A in FIG. 15 is shown in FIGS. 18 to 20 to illustrate the cross-sectional shape of the projection of the corrugated protrusion 17. In FIGS. 18 to 20, the distribution hole 8a is a columnar hole communicating from the inner wall surface 61 to the outer wall surface 62 of the distribution cylinder, and the corrugated protrusion 17 is arranged between the distribution holes 8a. The cross-sectional shape of the corrugated protrusion 17 may be a trapezoid as in FIG. 18, a rectangle as in FIG. 19, or a semicircle as in FIG. 20, and may be any shape. The outer shape of the projection is preferably processed such that corners do not exist, or the corner portions are gradual to prevent scratches of the hollow fiber membrane. In addition, a plurality of projections 17 may be arranged between the distribution holes 8a.

The height of the corrugated protrusion 17 is preferably high since the water flow path to the distribution hole 8a can be easily ensured and the pressure loss or increase of the operation power can be suppressed, but is not preferable if the height of the corrugated protrusion 17 is too high since the hollow fiber membrane greatly bends and becomes easily damaged, and the strength of the projection 17 easily becomes weak. Generally, the height of the projection is preferably in the range of between 1 and 10 mm.

If a plurality of corrugated protrusions are arranged substantially in parallel, the interval between the corrugated protrusions is preferably 50 to 125% of the hole diameter of the distribution hole.

In the above-described embodiment, description has been made for a case where the groove 16 communicating the distribution holes is formed on the inner wall surface 61 of the distribution cylinder, and for a case where the corrugated protrusion 17 is arranged on the inner wall surface 61 of the distribution cylinder, but both the communication groove 16 and the corrugated protrusion 17 may be arranged on the inner wall surface of the distribution cylinder (not shown).

Furthermore, in the embodiment described above, the hole shape of the distribution holes 8a, 8b is a circular columnar shape, but the hole shape can be arbitrarily adopted, and may be a columnar shape having a cross section of a polygonal such as triangle, square, or hexagon, elliptical, fan-shape, or star shape. If the hole diameter of the distribution hole is a hole diameter measured in a direction parallel to the longitudinal direction of the hollow fiber membrane and is represented as the longest hole diameter, the hole diameter of the distribution hole is preferably in the range of between 1 and 10 mm. If the hole diameter is too small, the pressure loss becomes too large, and the number of holes needs to be increased to ensure the necessary discharge amount, whereby the hole processing becomes difficult. If, on the other hand, the hole diameter is too large, the hollow fiber membrane flows from the distribution hole to the annular flow path side so as to be pushed out, and then bent, whereby the hollow fiber membrane is easily damaged.

The filling rate of the hollow fiber membrane in the distribution cylinder is about 25 to 70%. The filling rate represents, in percentage, the proportion of the occupying area of the hollow fiber membrane with respect to the inner area of the distribution cylinder at the transverse plane of the minimum inner diameter portion in the distribution cylinder. The occupying area of the hollow fiber membrane is a value showing the area surrounded by the outer shape of the transverse plane of the hollow fiber membrane, assuming the interior of the hollow fiber membrane is solid, as the sum for all the hollow fiber membranes. The area of the filtration membrane increases by increasing the filling rate. When the present invention is applied, the blocking of the distribution hole by the hollow fiber membrane in time of water discharge can be prevented even if the filling rate is increased.

In the embodiment described above, the distribution cylinder 6a arranged at the vicinity of the inner side of the water discharge port 9 on an upper side surface of the cylindrical case has been described, but if the water supply port 10 arranged on a lower side surface of the cylindrical case is used as the discharge exit of water and air in time of backflow washing or in time of water discharge, a phenomenon in which the hollow fiber membrane is pushed by the discharged water thereby blocking the distribution hole occurs, similar to the distribution cylinder 6a in a case of discharging water and air from the water discharge port 9 on the upper side surface. Therefore, the communication groove or the corrugated protrusion, similar to the above, is preferably arranged on the inner wall surface of the distribution cylinder 6b arranged in the vicinity of the inner side of the water supply port 10 side of the lower side surface. If the communication groove or the corrugated protrusion is arranged on the inner wall surface of the distribution cylinder 6b on the lower side, the blocking of the distribution hole by the hollow fiber membrane is prevented, and pressure loss and increase in operation power can be avoided when discharging water in the module from the water supply port 10 in membrane washing or the like.

In the embodiment described above, a mode in which the hollow fiber membrane bundle where a great number of hollow fiber membranes are bundled in a straight state and the ends are adhered and fixed with resin is inserted into and arranged in the cylindrical case has been described, but the present invention may be applied to a hollow fiber membrane module in which a hollow fiber membrane bundle where a great number of hollow fiber membranes are bundled and then bent to a U-shape, and the ends are adhered and fixed with resin is inserted and fixed in the cylindrical case. Furthermore, the present invention may be applied to a so-called cartridge hollow fiber membrane module of a type in which a hollow fiber membrane cartridge formed as a cartridge with the hollow fiber membrane bundle as a configuring member is inserted and fixed in a housing of the module.

When filter processing the hollow fiber membrane shown in FIG. 1 through the internal pressure method, water flows in the opposite direction from the external pressure method. In other words, the opening of reference number 11 is defined as the raw water supply port, and the openings of reference number 9 and reference number 10 are defined as the filtrate water exit. In this case, the opening of reference number 12 is blocked.

EXAMPLES

Example 1

A hollow fiber membrane module (area of filtration membrane is 72 m$^2$) having a structure shown in FIG. 1 was fabricated using the distribution cylinder with groove. The hollow fiber membrane having an inner diameter of 0.9 mm and an outer diameter of 1.5 mm was used, and a hollow fiber membrane bundle in which the number of films is 9000 was arranged in the cylindrical case.

The shape of the distribution cylinder with groove is a cylindrical body with hole in which 350 circular distribution holes 8a each having a diameter of 5 mm are arranged in a staggered manner as shown in FIG. 5 on a plate surface of the cylindrical body (height of 150 mm, and minimum inner diameter of 180 mm) made of resin plate having a thickness of 3 mm, where the communication groove is formed on the inner wall surface. The pitch of the distribution hole 8a is 10 mm in the direction parallel to the longitudinal direction of the hollow fiber membrane, and 15 mm in the vertical direction. As shown in FIG. 5, the communication groove of the inner wall surface is a groove extending in a horizontal direction traversing the distribution hole 8a, where the intersecting angle with respect to the longitudinal direction of the hollow fiber membrane is defined as right angle. The depth of the communication groove is 1 mm, the width of the groove is 5 mm, and the cross-sectional shape is defined as a rectangle as shown in FIG. 9. The distribution cylinder with groove having such shape was fabricated through injection molding polyvinyl chloride resin.

The distribution cylinder with groove was attached as the distribution cylinder 6a on the water discharge port 9 side. Furthermore, the distribution cylinder with groove of the same structure was also attached to the distribution cylinder 6b on the water supply port 10 side. The filling rate of the hollow fiber membrane in the distribution cylinder was 62.5%.

The filter operation test was conducted using the hollow fiber membrane module. First, the water of Lake Biwa was supplied from the water supply port 10 with a pump as raw water, and filtering was performed on the entire amount for 30 minutes. The filtrate water was supplied at 300 L/min from the filtrate water exit 11 to perform backflow washing, and the backflow washing water was flowed out from the water discharge port 9. In performing such backflow washing, the pressure necessary for supplying the filtrate water to the filtrate water exit 11 was 20 kPa.

Another filter operation test was conducted using the hollow fiber membrane module same as the above. First, the water of Lake Biwa was supplied from the water supply port 10 with a pump as raw water, and filtering was performed on the entire amount for 30 minutes. The filtrate water was supplied at 300 L/min from the filtrate water exit 11 to perform backflow washing, and at the same time, high pressure air was supplied at 200 L/min from the bottom water passing port 12 to perform air scrubbing, and the backflow washing water and air were flowed out from the water discharge port 9.

In performing such washing, the pressure necessary for supplying the filtrate water to the filtrate water exit 11 was 40 kPa.

Example 2

In the distribution cylinder used in the first example, the cross-sectional shape of the groove was changed to a V-shape such that the depth is 1 mm, and the width is 5 mm, as shown in FIG. 10. The distribution cylinder with groove was attached similar to the first example to fabricate the hollow fiber membrane module.

The filter operation test was conducted under the same condition as the first example using such hollow fiber membrane module. As a result, the pressure at the filtrate water exit 11 in a case where the backflow washing was performed was 15 kPa. The pressure at the filtrate water exit 11 in a case where the backflow washing and the air scrubbing were simultaneously performed was 30 kPa.

Example 3

In the distribution cylinder used in the first example, the cross-sectional shape of the groove was changed to a shape (V-connection shape) in which three V-shapes each having a depth of 1 mm and a width 1.7 mm are formed for one groove, and a hill between the V-shapes is formed to a trapezoidal shape grounded by 0.3 mm. Such distribution cylinder with groove was attached similar to the first example to fabricate the hollow fiber membrane module.

The filter operation test was conducted under the same condition as the first example using such hollow fiber membrane module. As a result, the pressure at the filtrate water exit 11 in a case where the backflow washing was performed was 10 kPa. The pressure at the filtrate water exit 11 in a case where the backflow washing and the air scrubbing were simultaneously performed was 20 kPa.

Example 4

In the distribution cylinder used in the first example, the longitudinal direction of the groove 16 was changed to a diagonal direction, as shown in FIG. 7. The intersecting angle of the groove 16 with respect to the longitudinal direction of the hollow fiber membrane in this case was 37 degrees. Such distribution cylinder with groove was attached to the hollow fiber membrane module similar to the first example to fabricate the hollow fiber membrane module.

The filter operation test was conducted under the same condition as the first example using such hollow fiber membrane module. As a result, the pressure at the filtrate water exit 11 in a case where the backflow washing was performed was 25 kPa. The pressure at the filtrate water exit 11 in a case where the backflow washing and the air scrubbing were simultaneously performed was 50 kPa.

Example 5

Other than using the distribution cylinder with corrugated protrusion for the distribution cylinder, the hollow fiber membrane module having the same structure as the first example was fabricated.

The shape of the distribution cylinder with corrugated protrusion is a cylindrical body with hole in which 350 circular distribution holes 8a each having a diameter of 5 mm are arranged in a staggered manner as shown in FIG. 13 on the plate surface of the cylindrical body (height of 150 mm, and minimum inner diameter of 180 mm) made of resin plate having a thickness of 3 mm, where the corrugated protrusion is formed on the inner wall surface. The pitch of the distribution hole 8a is 10 mm in the direction parallel to the longitudinal direction of the hollow fiber membrane, and 15 mm in the vertical direction. As shown in FIG. 13, the corrugated protrusion 17 continuously extending in a direction in which the intersecting angle with respect to the longitudinal direction of the hollow fiber membrane is defined as a right angle is arranged on the inner wall surface. The height of the corrugated protrusion is 2 mm, the width of the projection is 2 mm, and the cross-sectional shape is a trapezoid having an upper base of 1 mm, as shown in FIG. 18. The distribution cylinder with corrugated protrusion having such shape was fabricated through injection molding polyvinyl chloride resin.

The distribution cylinder with corrugated protrusion was attached as the distribution cylinder 6a on the water discharge port 9 side, and also as the distribution cylinder 6b on the water supply port 10 side, similar to the first example, to fabricate the hollow fiber module (filling rate of the hollow fiber membrane in the distribution cylinder was 62.5%).

The filter operation test was conducted under the same condition as the first example using such hollow fiber membrane module. As a result, the pressure at the filtrate water exit 11 in a case where the backflow washing was performed was 10 kPa. The pressure at the filtrate water exit 11 in a case where the backflow washing and the air scrubbing were simultaneously performed was 20 kPa.

Example 6

In the distribution cylinder with corrugated protrusion used in the fifth example, the cross-sectional shape of the corrugated protrusion was changed to a rectangle having a height of 2 mm and a width of 2 mm, as shown in FIG. 19. Such distribution cylinder with corrugated protrusion was attached similar to the first example to fabricate the hollow fiber membrane module.

The filter operation test was conducted under the same condition as the first example using such hollow fiber membrane module. As a result, the pressure at the filtrate water exit 11 in a case where the backflow washing was performed was 15 kPa. The pressure at the filtrate water exit 11 in a case where the backflow washing and the air scrubbing were simultaneously performed was 30 kPa.

Example 7

In the distribution cylinder with corrugated protrusion used in the fifth example, the cross-sectional shape of the corrugated protrusion was changed to a semicircle having a height of 1 mm and a width of 2 mm, as shown in FIG. 20. Such distribution cylinder with corrugated protrusion was attached similar to the first example to fabricate the hollow fiber membrane module.

The filter operation test was conducted under the same condition as the first example using such hollow fiber membrane module. As a result, the pressure at the filtrate water exit 11 in a case where the backflow washing was performed was 20 kPa. The pressure at the filtrate water exit 11 in a case where the backflow washing and the air scrubbing were simultaneously performed was 40 kPa.

Example 8

In the distribution cylinder used in the fifth example, the longitudinal direction of the corrugated protrusion 17 was changed to a diagonal direction, as shown in FIG. 16. The intersecting angle of the corrugated protrusion 17 with respect to the longitudinal direction of the hollow fiber membrane in this case was 37 degrees. Such distribution cylinder with corrugated protrusion was attached to the hollow fiber membrane module similar to the first example to fabricate the hollow fiber membrane module.

The filter operation test was conducted under the same condition as the first example using such hollow fiber membrane module. As a result, the pressure at the filtrate water exit 11 in a case where the backflow washing was performed was 15 kPa. The pressure at the filtrate water exit 11 in a case where the backflow washing and the air scrubbing were simultaneously performed was 30 kPa.

Comparative Example

Except that the groove or the corrugated protrusion is not arranged on the inner wall surface of the distribution cylinder, the distribution cylinder of the same shape as the other described examples was fabricated. Such distribution cylinder was attached similar to the first example to fabricate the hollow fiber membrane module.

The filter operation test was conducted under the same condition as the first example using such hollow fiber membrane module. As a result, the pressure at the filtrate water exit 11 in a case where the backflow washing was performed rose to 150 kPa, and high load was applied even on the pump. The pressure at the filtrate water exit 11 in a case where the backflow washing and the air scrubbing were simultaneously performed rose to 200 kPa, and high load was applied even on the pump.

industrial water application for producing industrial water, and the like. Application can also be made to other water filtration and liquid filtration.

The invention claimed is:

1. A hollow fiber membrane module comprising a hollow fiber membrane bundle including a great number of hollow fiber membranes arranged in a cylindrical case having a water entrance/exit opening formed on a side surface of the cylindrical case, an end of the hollow fiber membrane bundle being adhered and fixed at an outer axial end of the cylindrical case axially outside the water entrance/exit opening at the side surface of the cylindrical case; wherein
a distribution cylinder formed with a distribution hole is arranged on an inner axial side of the water entrance/exit opening at the side surface of the cylindrical case so as to surround an outer periphery of the hollow fiber membrane bundle, and a groove for communicating the distribution holes is arranged on a surface on the inner cylindrical side of the distribution cylinder.

2. A hollow fiber membrane module comprising a hollow fiber membrane bundle including a great number of hollow fiber membranes arranged in a cylindrical case having a water entrance/exit opening formed on a side surface of the cylindrical case, an end of the hollow fiber membrane bundle being adhered and fixed at an outer axial end of the cylindrical case axially outside the water entrance/exit opening at the side surface of the cylindrical case; wherein
a distribution cylinder formed with a distribution hole is arranged on an inner axial side of the water entrance/exit opening at the side surface of the cylindrical case so as to surround an outer periphery of the hollow fiber mem-

TABLE 1

| | Groove or protrusion on inner wall surface of distribution cylinder | | | Pressure in washing (kPa) | |
|---|---|---|---|---|---|
| | | Longitudinal direction | | Water | Water backflow |
| | Direction | Intersecting angle α | Cross-sectional shape | backflow washing | washing and air scrubbing |
| Example 1 | Parallel groove | Horizontal, FIG. 5 | 90 degrees | Rectangle, FIG. 9 | 20 | 40 |
| Example 2 | Parallel groove | Horizontal, FIG. 5 | 90 degrees | V-Shape, FIG. 10 | 15 | 30 |
| Example 3 | Parallel groove | Horizontal, FIG. 5 | 90 degrees | V-Connection shape, FIG. 11 | 10 | 20 |
| Example 4 | Intersecting diagonal groove | Diagonal, FIG. 7 | 37 degrees | Rectangle, FIG. 9 | 25 | 50 |
| Example 5 | Parallel protrusion | Horizontal, FIG. 13 | 90 degrees | Trapezoid, FIG. 18 | 10 | 20 |
| Example 6 | Parallel protrusion | Horizontal, FIG. 13 | 90 degrees | Rectangle, FIG. 19 | 15 | 30 |
| Example 7 | Parallel protrusion | Horizontal, FIG. 13 | 90 degrees | Semicircle, FIG. 20 | 20 | 40 |
| Example 8 | Intersecting diagonal protrusion | Diagonal, FIG. 16 | 37 degrees | Trapezoid, FIG. 18 | 15 | 30 |
| Comparative Example | (No groove or protrusion) | | | 150 | 200 |

INDUSTRIAL APPLICABILITY

The hollow fiber membrane module of the present invention is suitably used in clean water application for producing clean water by filtering freshwater such as stream water and lake water. In addition, application can also be made to sewage water application for filter processing sewage water, brane bundle, and a corrugated protrusion is arranged on a surface on the inner cylindrical side of the distribution cylinder.

3. The hollow fiber membrane module according to claim 1 or 2, wherein a longitudinal direction of the groove or a longitudinal direction of the corrugated protrusion arranged on the surface on the inner side of the distribution cylinder is a direction intersecting a longitudinal direction of the hollow fiber membrane.

4. The hollow fiber membrane module according to claim 3, wherein the groove intersecting the longitudinal direction of the hollow fiber membrane or the corrugated protrusion intersecting the longitudinal direction of the hollow fiber membrane is arranged on the surface on the inner cylindrical side of the distribution cylinder.

5. The hollow fiber membrane module according to claim 1 or 2, wherein a plurality of the groove or the corrugated protrusion is arranged on the surface on the inner cylindrical side of the distribution cylinder, and the plurality of grooves or corrugated protrusions have a parallel longitudinal direction.

6. The hollow fiber membrane module according to claim 1 or 2, wherein a plurality of the groove or the corrugated protrusion is arranged on the surface on the inner cylindrical side of the distribution cylinder, and at least some of the plurality of grooves or the corrugated protrusions intersect each other at the surface on the inner cylindrical side of the distribution cylinder.

7. The hollow fiber membrane module according to claim 1 or 2, wherein an intersecting angle of a longitudinal direction of the groove or the corrugated protrusion arranged on the surface on the inner cylindrical side of the distribution cylinder and a longitudinal direction of the hollow fiber membrane is respectively greater than or equal to 30 degrees and smaller than or equal to 90 degrees.

8. The hollow fiber membrane module according to claim 1, wherein a width of the groove arranged on the surface on the inner cylindrical side of the distribution cylinder is between 50% and 125% of a hole diameter of the distribution hole, and a depth of the groove is between 10 and 50% of the thickness of the distribution cylinder surface.

9. The hollow fiber membrane module according to claim 2, wherein the corrugated protrusion arranged on the surface on the inner cylindrical side of the distribution cylinder has an interval between the corrugated protrusions of between 50% and 125% of a hole diameter of the distribution hole, and a height of the corrugated protrusion is between 1 and 10 mm.

10. The hollow fiber membrane module according to claim 1 or 2, wherein a hole diameter of the distribution hole formed in the distribution cylinder is between 1 and 10 mm, and a filling rate of the hollow fiber membrane is between 25 and 70%.

11. The hollow fiber membrane module according to claim 1 or 2, wherein a water discharge opening is arranged as the water entrance/exit opening on the side surface of the cylindrical case, and the distribution cylinder is arranged on the inner axial side of the water discharge opening so as to surround the outer periphery of the hollow fiber membrane bundle.

12. The hollow fiber membrane module according to claim 1 or 2, wherein a water discharge opening and a water supply opening are arranged as the water entrance and exit openings on the side surface of the cylindrical case, the distribution cylinder is arranged on the inner axial side of the water discharge opening so as to surround the outer periphery of the hollow fiber membrane bundle, and the distribution cylinder is arranged on the inner axial side of the water supply opening so as to surround the outer periphery of the hollow fiber membrane bundle.

* * * * *